US011200028B2

(12) United States Patent  
Newell et al.

(10) Patent No.: US 11,200,028 B2  
(45) Date of Patent: *Dec. 14, 2021

(54) APPARATUS, SYSTEMS AND METHODS FOR PRESENTING CONTENT REVIEWS IN A VIRTUAL WORLD

(71) Applicant: DISH Network L.L.C., Englewood, CO (US)

(72) Inventors: Nicholas Newell, Centennial, CO (US); Rob Johannes Clerx, Boulder, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,607

(22) Filed: Jan. 14, 2021

(65) Prior Publication Data

US 2021/0141599 A1 May 13, 2021

Related U.S. Application Data

(63) Continuation of application No. 15/906,130, filed on Feb. 27, 2018, now Pat. No. 10,901,687.

(51) Int. Cl.
| | |
|---|---|
| *G06F 3/16* | (2006.01) |
| *G06F 3/01* | (2006.01) |
| *G10L 15/08* | (2006.01) |
| *G06F 3/0481* | (2013.01) |
| *G06F 3/0484* | (2013.01) |
| *G06T 13/40* | (2011.01) |

(52) U.S. Cl.
CPC .............. *G06F 3/167* (2013.01); *G06F 3/013* (2013.01); *G06F 3/017* (2013.01); *G06F 3/04815* (2013.01); *G06F 3/04842* (2013.01); *G06F 3/165* (2013.01); *G06T 13/40* (2013.01); *G10L 15/08* (2013.01)

(58) Field of Classification Search
CPC .......... G06F 3/167; G06F 3/013; G06F 3/017; G06F 3/04815; G06F 3/04842; G06F 3/165; G06F 3/16; G06F 3/011; G06F 3/01; G06F 3/0481; G06F 3/0484; G06T 13/40; G06T 13/20; G10L 15/08
See application file for complete search history.

(56) References Cited

U.S. PATENT DOCUMENTS

| | | |
|---|---|---|
| 5,893,902 A | 4/1999 | Transue |
| 6,229,533 B1 | 5/2001 | Farmer |
| 6,476,830 B1 | 11/2002 | Farmer |
| 7,086,005 B1 | 8/2006 | Matsuda |
| 8,233,005 B2 | 7/2012 | Finn |
| RE44,054 E | 3/2013 | Kim |
| 8,627,215 B2 | 1/2014 | Blattner |
| 8,753,185 B1 | 6/2014 | Klappert et al. |

(Continued)

*Primary Examiner* — Jung-Mu T Chuang  
(74) *Attorney, Agent, or Firm* — Perkins Coie LLP

(57) ABSTRACT

Media content event review systems and methods are operable to present member content reviews of a media content event by presenting a plurality of member avatars in a virtual world, wherein the member avatars present audio commentary about a media content event identified in a user request, and wherein the community members who generated the audio commentary about the media content event have an interpersonal relationship with the requesting user.

20 Claims, 5 Drawing Sheets

(56) References Cited

U.S. PATENT DOCUMENTS

| | | |
|---|---|---|
| 9,020,956 B1 | 4/2015 | Barr et al. |
| 9,129,026 B1 | 9/2015 | Hyatt |
| 9,210,313 B1 | 12/2015 | Svendsen |
| 9,607,419 B2 | 3/2017 | Kim |
| 9,851,561 B2 | 12/2017 | Lu |
| 10,158,917 B1 | 12/2018 | Logan |
| 10,270,983 B1 | 4/2019 | Van Os |
| 2001/0019330 A1 | 9/2001 | Bickmore |
| 2001/0042098 A1* | 11/2001 | Gupta .................. G06F 40/169 709/206 |
| 2002/0113791 A1 | 8/2002 | Li |
| 2002/0147991 A1 | 10/2002 | Furlan et al. |
| 2005/0081159 A1 | 4/2005 | Gupta |
| 2007/0162863 A1 | 7/2007 | Buhrke |
| 2007/0168863 A1 | 7/2007 | Blattner |
| 2007/0271331 A1 | 11/2007 | Muth |
| 2007/0271338 A1* | 11/2007 | Anschutz .............. H04L 67/148 709/204 |
| 2008/0030429 A1* | 2/2008 | Hailpern .............. A63F 13/213 345/8 |
| 2008/0215975 A1 | 9/2008 | Harrison |
| 2009/0144272 A1 | 6/2009 | Adarsh et al. |
| 2009/0198675 A1 | 8/2009 | Mihalik |
| 2010/0050088 A1 | 2/2010 | Neustaedter |
| 2010/0077315 A1 | 3/2010 | Fujioka |
| 2010/0115426 A1* | 5/2010 | Liu ..................... G06Q 10/107 715/757 |
| 2010/0162136 A1 | 6/2010 | Hamilton, II |
| 2010/0185510 A1 | 7/2010 | Maier |
| 2010/0188929 A1 | 7/2010 | Kitaura |
| 2010/0205541 A1 | 8/2010 | Rapaport |
| 2010/0220097 A1 | 9/2010 | Hamilton, II |
| 2011/0225498 A1* | 9/2011 | Goldman .............. G06Q 50/01 715/727 |
| 2011/0252344 A1 | 10/2011 | van Os |
| 2011/0304632 A1 | 12/2011 | Evertt |
| 2012/0116804 A1* | 5/2012 | Mesika ................ G06Q 50/01 705/3 |
| 2012/0158753 A1* | 6/2012 | He ....................... G06F 16/957 707/752 |
| 2012/0253492 A1* | 10/2012 | Andrews ................ G10L 15/26 700/94 |
| 2013/0013089 A1* | 1/2013 | Kawakami ......... H04N 21/4788 700/90 |
| 2013/0050258 A1* | 2/2013 | Liu ....................... G06F 3/005 345/633 |
| 2013/0051548 A1 | 2/2013 | Chavez |
| 2013/0086185 A1 | 4/2013 | Desmarais |
| 2013/0097176 A1 | 4/2013 | Khader et al. |
| 2013/0173268 A1 | 7/2013 | Weng |
| 2013/0278631 A1* | 10/2013 | Border .................. G02C 5/143 345/633 |
| 2014/0337267 A1 | 11/2014 | Karamchedu |
| 2015/0002394 A1 | 1/2015 | Cho |
| 2015/0235398 A1 | 8/2015 | Kim |
| 2015/0249815 A1* | 9/2015 | Sandrew .............. G06T 15/205 348/47 |
| 2015/0301725 A1 | 10/2015 | Madhvanath |
| 2016/0364651 A1 | 12/2016 | Flinn et al. |
| 2017/0026669 A1* | 1/2017 | Newell ................ H04N 21/233 |
| 2017/0068430 A1 | 3/2017 | Brown |
| 2017/0076485 A1 | 3/2017 | Shuster |
| 2017/0139920 A1* | 5/2017 | Ball ....................... H04L 51/32 |
| 2017/0344809 A1 | 11/2017 | Twyman et al. |
| 2018/0077440 A1 | 3/2018 | Wadhera et al. |
| 2018/0181367 A1 | 6/2018 | Goi |
| 2018/0189691 A1 | 7/2018 | Oehrle et al. |
| 2018/0190010 A1* | 7/2018 | Sawaki ................. H04N 21/00 |
| 2018/0262717 A1 | 9/2018 | Imaoka |
| 2019/0012836 A1 | 1/2019 | Lim |
| 2019/0130599 A1 | 5/2019 | Gebbie |
| 2019/0188895 A1* | 6/2019 | Miller, IV .......... G06K 9/00604 |
| 2019/0206128 A1 | 7/2019 | Logan |
| 2019/0261125 A1 | 8/2019 | Lyren |
| 2019/0265945 A1 | 8/2019 | Newell |
| 2019/0278295 A1 | 9/2019 | Matsuno |
| 2019/0379877 A1 | 12/2019 | Oh et al. |
| 2020/0265070 A1* | 8/2020 | Rapaport ............... G06Q 10/10 |

\* cited by examiner

APPARATUS, SYSTEMS AND METHODS FOR PRESENTING CONTENT REVIEWS IN A VIRTUAL WORLD

CROSS-REFERENCE TO RELATED APPLICATION

This patent application is a Continuation of U.S. Non-Provisional patent application Ser. No. 15/906,130, filed Feb. 27, 2018, entitled "APPARATUS, SYSTEMS AND METHODS FOR PRESENTING CONTENT REVIEWS IN A VIRTUAL WORLD," the disclosure of which is incorporated herein by reference in its entirety.

BACKGROUND

Media devices, such as a set top box, a stereo, a television, a computer system, a game system, or the like, are often configured to present a particular media content event to a user. Alternatively, a user may go to a theatre or the like to view (interchangeably referred to herein as consume) the media content event.

Typically, a media content event presents theme-based visual and audio content to a user for their enjoyment and/or for informative purposes. Examples of such theme-based content includes movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically. Advertisements, commercials or the like may be interspersed within the media content event.

In some instances, prior to viewing the media content event, the user may choose to view information about the media content event of interest. Alternatively, or additionally, after viewing the media content event, the user may choose to view information about the media content event of interest. Various synopsis of the media content event may be available from a variety of sources that describe the story line or other aspects of the media content event.

Information about a media content event may also include reviews of the media content event made by individuals or other entities which are accessibly by the user. Such reviews may be generated by expert individuals, such as movie critics, movie producers, or other parties and/or entities familiar with the particular media content event that is of interest to the user. Friends or other individuals may also have generated reviews of the media content event of interest.

Social media platforms may be available to the user which provide access to these media content event reviews that have been generated by members of the social media community. Thus, the user may access the social media platform to identify, and then consume, the reviews prepared by the members of the social media community that they believe may be of interest and/or that are pertinent to the media content event of interest.

However, identifying particular community member reviews to consume is a difficult and time consuming effort on the part of the user, especially if there are hundreds or even thousands of available community member reviews to choose from. Further, it is very likely that the user may not identify particularly pertinent or relevant reviews about the media content event of interest.

Accordingly, there is a need in the arts to provide an improved user-friendly social media platform environment that facilitates the user's identification of available reviews, and that facilitates the user's selection of particular reviews that they wish to consume.

SUMMARY

Systems and methods of providing review of media content events are disclosed. An exemplary embodiment is operable to present member content reviews of a media content event by presenting a plurality of member avatars in a virtual world, wherein the member avatars present audio commentary about a media content event identified in a user request, and wherein the community members who generated the audio commentary about the media content event have an interpersonal relationship with the requesting user.

BRIEF DESCRIPTION OF THE DRAWINGS

Preferred and alternative embodiments are described in detail below with reference to the following drawings.

DETAILED DESCRIPTION

Figure 1:
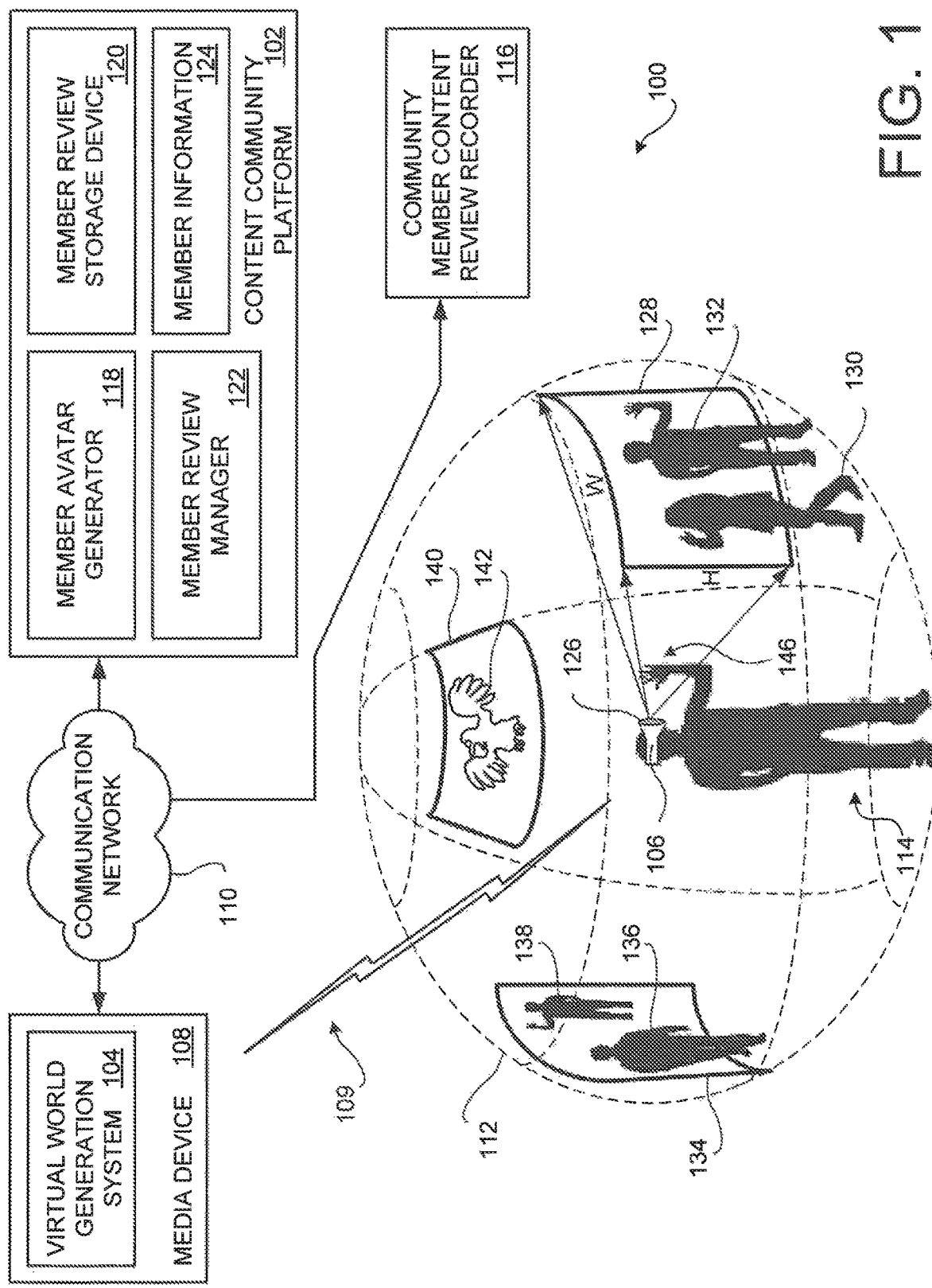
FIG. 1 is a block diagram of an embodiment of a 360 degree (°) content review system.

FIG. 1 is a block diagram of an embodiment of a 360 degree (°) content review system 100. The 360° content review system 100 may be integrated with a content community platform 102. The 360° content review system 100 comprises a virtual world generation system 104 that may reside in or may be a component of a media device 108. The virtual world generation system 104 is communicatively coupled to a virtual world presentation system, such as, but not limited to a suitable head mounted virtual reality display device 106 (HMD 106), preferably via a suitable wireless link 109 (though some alternative embodiments may employ a wire-based link). Any virtual world presentation system now known or later developed may be used to present member content reviews to a user or to multiple users. The content community platform 102 is communicatively coupled the virtual world generation systems 104 via communication network 110.

In an example embodiment, the virtual world generation system 104 is implemented in the illustrated media device 108, such as a set top box (STB). Embodiments of the virtual world generation system 104 may be implemented in other media devices, such as, but not limited to, a stereo, a surround-sound receiver, a radio, a television (TV), a digital video disc (DVD) player, a digital video recorder (DVR), a game playing device, a personal computer (PC) or even within the HMD 106. Alternatively, the virtual world generation system 104 may be implemented as a stand alone electronic device.

Embodiments of the 360° content review system 100 facilitate the user's identification and selection of particular community member content reviews. The 360° content review system 100 is configured to generate a 360° virtual world 112 that is experienced by the user wearing their HMD 106 that they are wearing. The 360° virtual world 112 is interactive with the user 114 to facilitate selection of community member reviews of interest.

Within the context of a social media platform with a plurality of community members (not shown), a social media community is served by the content community platform 102. Individual community members generate their content review for a particular media content event using their community member content review recorder 116. The member's content review is interchangeably referred to herein as a member video. An example member video generation process is described in commonly assigned U.S. Pat. No. 9,467,718, which is incorporated herein by reference in its entirety.

The community member's content review expresses the member's personal opinions and/or views about the media content event, and/or describes their personal experience while they were viewing the media content event. Typically, the community member creates their content review after consuming a particular media content event, although the member's content review may be made at any point in time. A content review includes the community member's spoken commentary (interchangeably referred to herein as the audio portion of the review), and may optionally include a video of the community member that is captured while they are making their audio commentary.

The community member content review recorder 116 is an electronic device that captures (records) the spoken commentary of the reviewing community member. The community member content review recorder 116 may be a smart phone, a cell phone, a personal device, a personal computer, a laptop computer, an image capture device or other suitable electronic device that is capable of recording audio content spoken by the community member. Optionally, the community member content review recorder 116 may acquire video content (video images) of the community member and/or of the community member's environment while they are speaking.

Each of the plurality of community member content review recorders 116 (wherein each community member has one or more of the recorders 116) are communicatively coupled to the 360° content review system 100 via the communication network 110. In an example embodiments, the 360° content review system 100 comprises a virtual world generation system 104, a member avatar generator 118, a member avatar storage device 120, and a member avatar manager 122. The separately illustrated and described member avatar generator 118, the member avatar storage device 120, and the member avatar manager 122 are illustrated as residing in the content community platform, which has other components and systems (not shown). However, in alternative embodiments, these component may be integrated together, may be integrated with other electronic devices and/or systems, and/or may be located in different geographic locations.

During generation of, or after generation of, the community member's content review is communicated to the content community platform 102. The member avatar generator 118 residing in the content community platform 102 processes the received community member's content review into a form that is suitable for presentation to the user 114 when they are experiencing their 360° virtual world 112. Part of the processing includes generation of an animated member avatar that graphically depicts the community member which appears to be speaking their content review.

Each community member's content review for a particular media content event, and the associated member avatar, are stored in the member avatar storage device 120.

In practice, when the user 114 is experiencing the 360° virtual world 112, a particular media content event of interest will be initially specified by the user 114. That is, when the user is interested in learning about a particular media content event, or wants to consume one or more of the other community member's previously created content reviews, the user generates a user request that specifies the media content event that they are interested in. The user request also identifies the user 114 by including user identify information that uniquely identifies the user 114.

Information corresponding to the user's specified media content event of interest is communicated to the member avatar manager 122 as a request. The request indicates to the 360° content review system 100 that the user 114 is interested in experiencing a plurality of community member content reviews in their unique 360° virtual world 112. Based on the specified media content event, the member avatar manager 122 identifies a plurality of member's content reviews made by the members of the community.

One skilled in the art appreciates that in a large community environment, for any particular media content event, there may be hundreds of, or even thousands of, different member content reviews available for presentation (as member avatars) to the requesting user 114. In practice, embodiments of the 360° content review system 100 are configured to identify particular ones of the available member content reviews that the requesting user 114 is likely to want to consume. Accordingly, embodiments of the 360° content review system 100 identify a manageable number of content reviews that are to be available to the user 114 for selection and presentation while they are experiencing their 3600 virtual world 112. In the various embodiments, each selected content review is represented by a member avatar.

Embodiments of the 360° content review system 100 select member reviews that the user 114 may be interested in consuming. Selection from the many hundreds, or even thousands of, available community member reviews is based on the interpersonal relationship (interchangeably referred to herein as an affinity) between the requesting user 114 and the community members who generated the content review. Once the member reviews have been selected, then member avatars corresponding to the selected member reviews are then presented to the user 114 when they are experiencing their 360° virtual world 112.

The initially received user request identifies the media content event that is of interest to the user 114. The member avatar manager 122 then identifies all available community member reviews for the specified media content event.

Once the plurality of member content reviews associated with the specified media content event of interest are identified based on the received user's request, the member avatar manager 122 accesses information about the user 114 from the member information storage device 124. Information about the requesting user 114 is stored in the member information storage device 124. The member information storage device 124 is a suitable memory medium, memory device or memory system, that stores information about that specific user 114 (along with information for all community members). The stored information about the requesting user 114 includes personal relationship information describing the interpersonal relationships between the user 114 and other community members that the user personally knows (such as friends or relatives).

Based on the information about the user 114, a plurality of member's content reviews made by the members of the community are identified by the member avatar manager 122 based on a determination of whether the user 114 will likely be interested in consuming (viewing) a particular one of the member's content reviews. The selection of particular ones of the available member content reviews by the member avatar manager 122 is based on the interpersonal relationship between the user 114 and the particular community member who created the content review for the specified media content event of interest. That is, a community member's content review may be selected for possible presentation to the requesting user if there is some degree of interpersonal relationship (affinity) between that community member and the requesting user 114.

Embodiments identify those community members (who have generated content reviews) that the user has an interpersonal relationship by comparing interpersonal relationship factors that described such interpersonal relationships between the user 114 and the particular community member who created the content review. Further, a value or degree of affinity may be determined based on the interpersonal relationship factors. For example, a sibling of the user 114 will have a higher affinity value than the affinity value determined for a third cousin or a casual acquaintance.

Alternatively, or additionally, other community member's content review may be selected for possible presentation to the requesting user based on another factor, such as a user preference for certain notorious and well known individuals (such as actors or the like that the user prefers). Also, member content reviews that are known to be of high relevance and/or high regard within the community may be selected for presentation to the requesting user (such as when a particular community member is a well known and particularly knowledgeable movie critic, and/or if other community members have indicated that that particular community member and/or a particular member content review is especially enjoyable and/or relevant). For purposes herein, these other factors are defined as defined as interpersonal relationship factors (even though such factors are not directly related to a personal relationship with the requesting user 114).

Once the member avatar manager 122 has identified a plurality of member content reviews that are believed to be of interest to the particular requesting user 114, the member avatar manager 122 accesses the associated member avatar information stored in the member avatar storage device 120. Then, the member avatar manager 122 communicates the member avatar information that is used to generate each of the selected member avatars to the virtual world generation system 104. As noted herein, the member avatar information includes the associated community member content review and graphical information that is used to graphically render and present an animated visual avatar to the user 114 while they are experiencing their 360° virtual world 112. Video rendering is a process by which a computer or processor system processes information from a coded data source and uses that information to produce and display a still or video image. The computer code may include instructions on creating images verbatim for playing back a movie or may provide a set of guidelines that the processor system uses to generate a custom image such as a member avatar and a virtual world. Video rendering is appreciated by one skilled in the arts to be one of the most hardware-demanding processes for a processor system, especially when images are rendered and presented in real time.

As part of the initialization process (wherein the user 114 first enters into their 360° virtual world 112), information (data) defining a virtual world environment is used to construct a virtual world environment that the user 114 will see while experiencing their 360° virtual world 112. The virtual world environment is a background that includes images of various physical objects. The virtual world environment is presented around the presented plurality of member avatars (though some environment objects may appear in front of or behind of some of the presented member avatars). For example, the virtual world environment may correspond to a "burger joint" that the user 114 is familiar with. Thus, when the user 114 enters into their 360° virtual world 112, the user may begin their experience by entering into the burger joint through a door or entryway, and then walking over to the counter and/or tables were the member avatars (who would apparently be customers at the burger joint) are sitting or standing. Alternatively, the experience may begin with the user at the counter or sitting in a booth. The user 114 may then interact with selected ones of the member avatars to consume their review of the media content event of interest.

Embodiments of the 360° content review system 100 may use any suitable virtual world environment when presenting the 360° virtual world 112 to the user 114. For example, one virtual world environment may appear as an ocean or other body of water. With such an environment, the user 114 may have the perception that they are in a boat with the selected member avatars. Alternatively, or additionally, other member avatars may themselves appear to be in other boats that are located about the user's boat. Location of member avatars would be based on the degree of affinity between the user 114 and community members associated with the selected member avatar. For example, a close friend or relative of the user having a high affinity value could be represented as being in the same boat as the user, while a casual acquaintance (with a low affinity value) may be on a remote boat. The user could then perceive that they are moving about in their boat so as to be able to approach and "hear" the review by a member avatar of interest. The user's boat may move so that the user 114 may select a member avatar who appears to be in a different boat. Some member avatars may be presented as cartoon fish (or even real-life fish) swimming about the user's boat that the user 114 can interact with (such as by point to, or even catching by using virtual fishing gear). Particular cartoon avatars may be selected based on learned user preferences for types of characters (such as a species of animal) and/or actual user specifications.

Another non-limiting example virtual world environment may be the user's living room (or another location that is personal and unique to the user 114). Here, images of the user's living room could be acquired using a suitable image capture device or system. The corresponding virtual world environment could then be constructed based on the acquired images.

Yet another example virtual world environment could be a landscape that includes mountains and/or hills that the user 114 likes. Any suitable landscape anywhere in the world (or even in space) may be used to constrict the virtual world environment from captured images of the landscape. Different landscape images could be "stitched" together to create a unique 360° virtual world 112 environment.

Embodiments of the 360° content review system 100 may have a plurality of predefined virtual world environment templates that may be used by any of the community members when they are experiencing their unique 360° virtual world 112. One skilled in the art appreciates the types of different virtual world environments that may be used for presentation in a 360° virtual world 112 is limitless.

Preferably, the particular virtual world environment that will be used to construct the 360° virtual world 112 will have been predefined by the user. Alternatively, the user may specify the particular virtual world environment at the same time as when they specify the media content event of interest. For example, the user 114 may specify that the 360° virtual world 112 environment is to be their living room. On another occasion, the user may specify that the environment be a landscape that the user wishes to experience. Further, some embodiments may permit the user 114 to interactively change environments. For example, the user may initially begin their experience in their living room, and the change to a water environment. Here, the currently presented virtual world environment is simply changed to the requested virtual world environment.

Also, the presentation of member avatars may be modified to better fit with the currently presented environment. That is, at least one appearance characteristic of at least one of the member avatars is changed based on the second virtual world environment. For example, one of the presented member avatars may appear as a person when the virtual world environment is the living room or burger joint. Alternatively, that same member avatar may be represented as a cartoon fish when the virtual world environment is changed to a water environment.

Also as part of the initialization process (wherein the user 114 first enters into their 360° virtual world 112), the virtual world generation system 104 determines "where" each of the selected member avatars are to be initially presented within the 360° virtual world 112. The particular initial presentation location of each member avatar is based on the interpersonal relationships between the user 114 and the particular community member who created the content review for the specified media content event of interest. Alternatively, or additionally, presentation location may be determined based on other interpersonal relationship factor, such as a user preference for certain notorious and well known individuals, or members who are known to be particularly knowledgeable and/or are held in high regard within the community, and/or other suitable factors that are attributable to the user 114.

One skilled in the art appreciates that since the 360° virtual world 112 is a virtual reality, the initial presentation location of any particular member avatar can be defined at a particular perceived distance from the viewing user 114, at a particular orientation (polar angle) from the initial user's line of sight, and/or at a particular elevation (azimuth angle) from the initial user's line of sight. In an example embodiment, the initial user's line of sight is referenced from the center of the field of view that is initially presented on the display 126 of the user's HMD 106.

The initial presentation location of each selected member avatar is based on the degree of interpersonal relationship between the user 114 and each particular member avatar. Those member avatars having the closest interpersonal relationship (a high degree or value of affinity) with the user 114 have an initial presentation location that is closer to, and/or that is perceived to be at a more important and/or prominent location, that other member avatars whose associated community members have a weaker interpersonal relationship with the user 114. For example, close friends of the user 114 may be sitting in the same booth as the user 114 when the virtual world environment is a burger joint, while other member avatars with lower affinities may be located farther away. Similarly, close friends of the user 114 may be sitting in the same boat as the user 114 when the virtual world environment is a body of water, while other member avatars having a lower affinity may be in different boats. As yet another example, close friends of the user 114 may be sitting on the user's favorite couch when the virtual world environment is the user's living room, while other member avatars having a lower affinity may be in remote parts of the living room or even in other rooms of the user's home.

Once the initial presentation location information for the selected member avatars is determined by the virtual world generation system 104, the information to graphically present the selected member avatars at their determined initial presentation location is then communicated to the HMD 106 such that the plurality of member avatars are graphically represented in the 360° virtual world 112. In practice, when the user is experiencing their 360° virtual world 112 using their HMD 106, the particular member avatars that are within the current field of view of the user are graphically presented on the display 126 of the user's HMD 106.

Here, the user's current line of sight (which therefore defines their field of view) is continuously tracked. Based on the initial presentation location of the member avatars, member avatars that have an initial presentation location within the user's current field of view are identified by the virtual world generation system 104. These identified member avatars may then be rendered by the virtual world generation system 104 and presented on the display 126 of the user's HMD 106.

As the user turns their head, their current line of sight will change (along with an attendant change in the user's current field of view). Movement of the user's head is sensed by sensors residing in the HMD 106. As the user's current field of view changes as they re-orient their line of sight (by turning their head sidewise and/or upwards, and/or if the user 114 physically rotates their body), those particular member avatars with presentation locations within the user's current field of view are identified and are then rendered and presented on the display 126. Here, this process of identifying and present particular member avatars what are within the user's current field of view occurs on a real time, or near real time basis, as is understood in the arts of 3D virtual world presentation systems.

In some situations, a presented member avatar graphically represents an image of the actual community member who generated their respective content review. Thus, the user 114 may "recognize" a particular member avatar as representing a friend, a relative, or another known individual (such as an actor or other notoriously famous person). Additionally, or alternatively, a member avatar may be represented as a cartoon character, an inanimate physical object, or even an animated physical object (such as, but not limited to, a talking plant or animal). In other instances, stick figures or the like may be used to represent animated member avatars.

Accordingly, when the user 114 is "in" (experiencing) their 360° virtual world 112, and have specified a media content event of interest, a selected plurality of member avatars are available for presentation on the display 126 of the user's HMD 106. In an example embodiment, when the user 114 selects a particular member avatar, the selected member avatar "appears" to the user 114 as speaking their content review. That is, when the user 114 is consuming the particular content review that was generated by that selected community member, the user has the experience of hearing and seeing the presented member's content review by listening to the audio porting or the content review and by seeing movement of the animated member avatar. Thus, the user 114 may selectively hear (consume) a plurality of different content reviews pertaining to the user's media content event of interest.

Since the 360° virtual world 112 spans a 360° field of view about the user 114, many different member avatars can be concurrently available for presentation about the user 114. To conceptually describe an operating environment, FIG. 1 conceptually illustrates that a limited number of the plurality of member avatars that are presented (viewable) within a current field of view 128 on the display 126 of the user's HMD 106.

The field of view 128 may be defined by an apparent width (W) and apparent height (H) that the user 114 is able to view on the display 126 at any given moment. Generally, the user's current line of sight is in the center of the current field of view 128, although the user's actual line of sight may be different depending upon the actual orientation of the user's eyes at any given instant in time. For example, a first member avatar 130 and a second member avatar 132 are illustrated in FIG. 1 as being currently viewed by the user 114 (since their currently determined presentation location falls within the user's current field of view 128). That is, FIG. 1 conceptually illustrates that the user 114 is looking towards a particular region of the 360° virtual world 112, as defined by the current field of view 128, and sees the two member avatars 130, 132.

As noted herein, a large number of member avatars may be concurrently presentable, or at least are available to be presented, when they are in the user's current field of view. For example, when the user 114 rotates their head (that is, changes their visual orientation) to look about the 360° virtual world 112, a plurality of different member avatars may be viewed by the user 114. To conceptually illustrate this operational feature, if the user 114 looks directly behind them in FIG. 1, the user will see a new current field of view 134 that includes a third member avatar 136 and a fourth member avatar 138.

Further, the view seen by the user 114 viewing the display 126 of their HMD 106 may present a perception of depth to the user 114. That is, the user will experience seeing member avatars that are perceived to be different distances from the virtual position of the user 114. Accordingly, some member avatars may appear to be located farther away from the user 114 (such as the member avatar 138) while other member avatars (such as the member avatar 134) may appear to be closer to the user 114. That is, each presented member avatar may appear to be located from the user 114 at some predefined apparent distance.

One skilled in the arts of 3D virtual worlds appreciates that a "farther" away member avatar will be presented using a smaller size than a closer member avatar. Further, the farther away member avatar may be shown to be behind the closer member avatar (where the closer member avatar partially obstructs presentation of a portion of the farther away member avatar) and/or behind physical objects of the virtual world environment. To conceptually illustrate this depth perception effect experienced by the user 114, the fourth member avatar 138 is illustrated in FIG. 1 as being smaller than the third member avatar 138, and therefore, the smaller member avatar 138 will perceived to be (appear to be) farther back from the user 114 that the perceived location of the member avatar 138.

Further, some member avatars may be located below or above the user's current field of view (and/or below or above other member avatars) since the 360° virtual world 112 may optionally encompass a sphere of viewable space around the user 114. For example, the user 114 may look upward such that they then see the field of view 140 above them. As noted herein, cartoon characters or other animated objects (animals, plants, etc.) may be used as member avatars. To illustrate, a cartoon member avatar 142 that appears as a cartoon bird is viewable by the user when looking at a field of view that corresponds to the field of view 140.

Since each member avatar may look different to the user 114, the user 114 may be able to identify particular community members who have generated a content review that they wish to listen to (that is, consume). For example, the user 114 may choose to listen to (consume) the content review generated by a recognizable friend or other individual of interest. Accordingly, embodiments of the 360° content review system 100 provide an efficient system and method for the user 114 to identify a potentially interesting review from among many different available reviews based on the identification of the community member who generated the associated content review, and based on the interpersonal relationship between the user 114 and the identified community member.

In some embodiments, the user 114 may specify particular interpersonal relationship factors that are to be used to determine the affinity for select member avatars. For example, the user 114 may specify that only close personal friends are to be selected (as contrasted with casual acquaintances of the user 114 or even unknown individuals, who may then not be selected as presented member avatars). As another example, the user 114 may specify that only siblings are to be selected (as contrasted with cousins of the user 114 or other distant relatives, who may then not be selected as presented member avatars). Alternatively, or additionally, the user may specify that only well known and notorious content critics are to be used for member avatar selection. In some applications, the user 114 may predefine the interpersonal relationship factor that they prefer (wherein the selection attributes are stored with other information about the user 114). Alternatively, the user may specify interpersonal relationship factors, and/or modify previously defined interpersonal relationship factors, when they initially specify the media content event of interest.

Further, the 360° content review system 100 provides a 3D 360° virtual world 112 that the user 114 may interact with. In practice, when many different member avatars are shown in the user's 360° virtual world 112 (wherein each member avatar each corresponds to a different community member who has generated a particular content review), the user 114 is able to virtually select any particular member avatar so that they may listen to that community member's content review. For example, the user 114 may move their hand 144 and virtually "touch" or point to the member avatar 130, wherein the member avatar 130 will then present their previously created content review to the user 114. Content reviews from other member avatars that are not virtually selected by the user 114 are not consumed by that user 114. Accordingly, embodiments of the 360° content review system 100 provide an efficient system and method for the user 114 to selectively consume reviews of particular interest from among many different available reviews.

Additionally, the user may adjust their physical location while experiencing their 360° virtual world 112. For example, the user 114 may be interested in consuming the content review from the member avatar 138. Here, the user may rotate their body (turn around) and then walk towards the farther away appearing member avatar 138. As the user 114 walks towards the member avatar 138, the member avatar 138 "appears" to become closer to the user 114 (by increasing the presentation size and/or location of the member avatar 138 in response to the movement of the user 114). Thus, the user may approach (walk up to) the member avatar 138, and then select the member avatar 138 (such as by virtually touching the member avatar 138) to initiate presentation of the content review associated with the member avatar 138.

Figure 2:
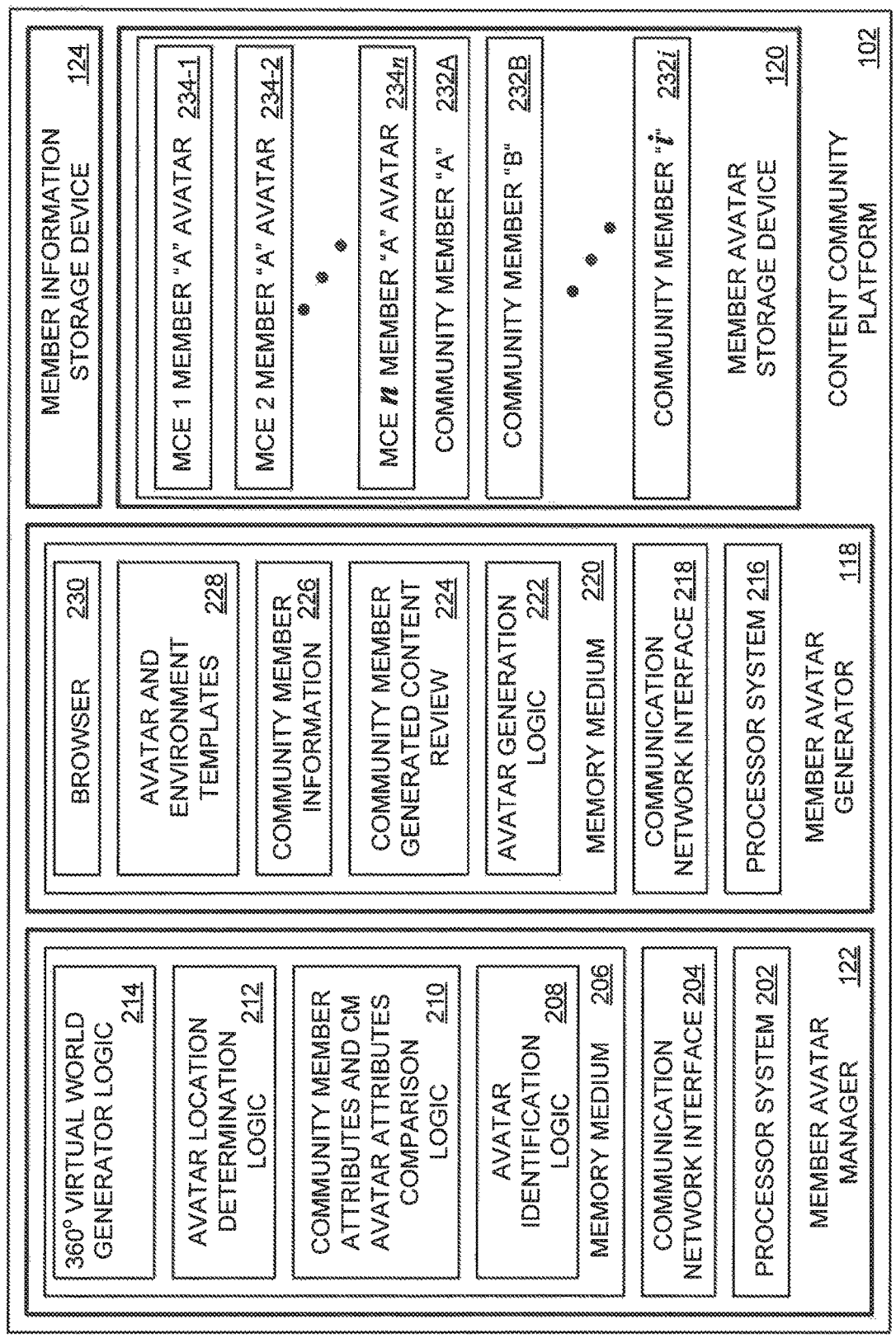
FIG. 2 is a block diagram of an example content community platform.

FIG. 2 is a block diagram of an example content community platform 102. The example content community platform 102 comprises the member avatar generator 118, the member avatar storage device 120, the member avatar manager 122, and the member information storage device 124.

The member avatar manager 122 comprises a processor system 202, a communication network interface 204 and a memory medium 206. The memory medium 206 comprises portions for storing the avatar identification logic 208, the community member attributes and member avatar attributes comparison logic 210, the optional avatar location determination logic 212, and the avatar data configuration logic 214.

The member avatar generator 118 comprises a processor system 216, a communication network interface 218 and a memory medium 220. The memory medium 220 comprises portions for storing the avatar generation logic 226, the community member generated content review 224, the community member information 226, the avatar and environment templates 228, and an optional browser 230.

The processor systems 202, 216 may be any suitable processor device or system now known or later developed. In some implementations, the processor systems 202, 216 may be a single processor system or device. Alternatively, processor systems 202, 216 may be implemented as a plurality of processor devices and/or systems operating in parallel and in concert with each other.

The memory medium 206, the memory medium 220, the member avatar storage device 120, and/or the member information storage device 124 may be comprised of any suitable memory medium. In some embodiments, the memory medium 206, the memory medium 220, the member avatar storage device 120, and/or the member information storage device 124 may employ a plurality of different memory mediums that store information. Such multiple memory mediums may be located locally at the content community platform 102. Alternatively, or additionally, the memory mediums may be distributed remotely from the content community platform 102. In some embodiments, one or more remotely located memory mediums may be configured to be communicatively coupled with a plurality of content community platforms 102. A working environment having the implemented 360 content review system 100 is anticipated to have thousands, or even hundreds of thousands, of different users. Accordingly, a distributed memory system and a plurality of content community platforms 102 working in concert together would facilitate the processing of life event information received from a very large number of, or even an unlimited number of, different users.

In some embodiments, the avatar identification logic 208, the community member attributes and member avatar attributes comparison logic 210, the optional avatar location determination logic 212, the avatar data configuration logic 214, the avatar generation logic 226, and/or the browser 230 may be integrated together, and/or may be integrated with, other logic. Alternatively, or additionally, in some embodiments, the community member generated content review 224, the community member information 226, and/or the avatar and environment templates 228 may be integrated together, and/or may be integrated with, other data or information that is stored locally and/or remotely. In other embodiments, some or all of these memory and other data manipulation functions may be provided by using a remote server or other electronic devices suitably connected via the Internet or otherwise to a client device. Other embodiments may include some, or may omit some, of the above-described media processing components. Further, additional components not described herein may be included in alternative embodiments of the content community platform 102. For example, the content community platform 102 may support a plurality of different functions and community member uses that are not directly related to the 360° content review system 100 as disclosed herein.

In practice, community member generated content reviews are communicated (as audio and as optional video information) from a community member's review recorder 116, via the communication network 110, to the content community platform 102. The communication network interface(s) 218 is configured to establish a communication link to each of the plurality of community member content review recorders 116. Preferably, the communication links are established in response to a communication link establishment request or the like initiated by the community member content review recorder 116 when (during or after) an associated community member is generating (or has generated) their member content review. Since there are a variety of different types of community member content review recorders 116, in practice, the communication network interface(s) 218 must be configurable so as to receive different types of communications in different formats from a variety of different types of recorders 116. Alternatively, a plurality of different communication network interface(s) 218 may be used to establish communication links to receive different formatted information from different types of recorders 116.

The audio and optional video information memorializing the community member's community member content review initially received from the recorders 116 is stored into the community member generated content review 224 portion of the memory medium 220 for processing into a member avatar. Also, the received community member content review includes information identifying the particular media content event that the community member is making their review about. Any suitable identifier of the media content event may be used, such as the title of the media content event. Further, the information may identify a particular scene, topic, story line and/or other portion of the media content event that the community member's review pertains to. For example, the community member's generated content review might pertain to a particular scene in the media content event.

Further, the received review includes information that uniquely identifies the community member (such as their name, their account information, or any other suitable unique identifier). The information that identifies the community member is stored into the community member information 226 portion of the memory medium 220 in an example embodiment. Alternatively, or additionally, the received community member identification information may be compared with identify information of a plurality of community members stored in the member information storage device 124 so as to verify the community member's identity. The received community member generated content review is then associated with the community member for later use in generating the member avatar, for determining the interpersonal relationship with a requesting user 114, and/or in determining the location of the member avatar during presentation of the user's unique 360° virtual world 112 (wherein particular community avatars are selected and are initially located based on that particular user and their interpersonal relationship with the community members who generated the associated content review).

Additionally, other information about the community member is accessed from other sources, and may saved into the community member information 226. For example, information characterizing the community member's expertise with respect to the media content event may be accessed and saved. Information about the community member's background, such a places of residence, age, sex, ethnicity, height, weight, hair color, eye color, and any other unique attributes. The community member's status within the community may be accessed and saved, such as when they are a recognized expert on a particular topic, a particular subject, and/or a particular media content event (where the information identifies the topics, subjects and/or media content events). The community member's relationship to the media content event may be accessed and saved (such as if the community member is an actor in and/or participated in the production of the media content event). This information is generically referred to herein as interpersonal relationship factors.

In some situations, the content review may be based on text written by the community member. Here, a speech synthesis system is used to synthesize audible speech based on the text of the content review. The synthesized audible speech is then used as the audio portion of the content review being spoken by the associated member avatar.

Additionally, or alternatively, interpersonal relationship factors describing the community member's interpersonal relationship to other community members (such as information that identification of their friends, relatives, business acquaintances, and/or enemies). This relationship information also includes information that characterizes each relationship (such as being a close friend/acquaintance, a best friend, or a casual friend/acquaintance). Such relationship information is defined herein as an interpersonal relationship factor.

In practice, this interpersonal relationship factors are accessed and then used to determine an interpersonal relationship (degree or value of affinity) between the community member and a particular requesting user 114. Based on the determined interpersonal relationship between a requesting user 114 and the community member associated with a particular member avatar, the initial presentation location of that community member's associated member avatar (if selected) is determined in the user's unique 360° virtual world 112. Community members with the highest degree of affinity are placed at initial presentation locations that are in the initial field of view and/or that are perceived to be relatively close to the viewing user 114.

Once a community member's generated content review has been received, the processor system 216 (executing the avatar generation logic 222) may then begin to acquire the information that is used to generate a member avatar based on the audio and optional video information of the received and stored member's content review. In overview, the audio information of a member content review is processed to select audio commentary that is output by the associated member avatar when the member avatar is presented in a 360° virtual world 112. That is, the selected audio commentary will appear to be spoken by the animated member avatar such that the user 114 will be able to consume (hear) that particular community member's content review.

Video information that may have been optionally included in the received member's content review may be used to generate a visual portion of the animated member avatar. For example, if the community member recorded a video of their face while speaking their content review, then the video portion corresponding to the selected audio commentary will appear to be spoken by a member avatar that resembles the community user (since the member avatar includes the video of at least the community member's face while they were speaking their content review) when the animated member avatar is presented in a 360° virtual world 112.

Other image information may also be acquired to generate the video portion of a member avatar. For example, but not limited to, previously acquired images and/or video of the community member, graphical information from one or more selected avatar templates, and/or graphical information received from remote devices or websites may be used to generate the video portion of a member avatar. To illustrate, the community member may have only captured images of their face while generating their audio commentary. However, to create a lifelike animated member avatar, additional supplemental information is required for the generation of the remaining portion of the body of the member avatar. This supplemental information will have to be obtained from another source (since the information is not available from the community member's generated content review). Other examples of using supplemental information to generate a lifelike animated member avatar is described in greater detail herein.

During generation of a member avatar, the selected audio commentary is combined with selected video and/or other image information that is used to create a lifelike animated member avatar. Then, supplemental information about the media content event (such as its title, story lines, scene information) and information about the originating community member (such as, but not limited to, their name, their expertise with respect to the media content event, their background, their status within the community, their relationship to the media content event, and/or their relationship to other community members) is incorporated into and/or is associated with the generated animated member avatar information.

Once the member avatar information of a member avatar has been generated by the processor system 216 executing the avatar generation logic 222, the generated member avatar (and its associated information) is stored into the member avatar storage device 120. The member avatar storage device 120 employs a suitable database system that enables future access of individual member avatars based on the particular media content event that the member avatar is providing a review about. Any suitable relational database system may be used by the various embodiments.

To conceptually illustrate an example embodiment of the member avatar storage device 120, generated member avatar information is stored with the other member avatar information that has been generated for the plurality of different community members. For example, a first portion 232A of the member avatar storage device 120 is conceptually illustrated as storing member avatars generated from a first member's (identified as community member "A") received content review. Similarly, second portion 232B of the member avatar storage device 120 is conceptually illustrated as storing member avatars generated from a second member's (identified as community member "B") received content review. Since any number of member avatars may be generated based on any number of reviews provided by hundreds of, or even thousands of, different community members, the member avatar storage device 120 may be relatively large, and accordingly, the memory capacity of the member avatar storage device 120 can be scalable to have any suitable capacity as needed over time. Here, an $i^{th}$ portion 232$i$ of the member avatar storage device 120 is conceptually illustrated as storing member avatars generated from the $i^{th}$ community member's (identified as community member "i") content review.

Continuing with the example member avatar storage device 120, member avatars are interchangeably referred to herein as community member avatar information. A member avatar comprises audio and graphical information that is used to render and present an animated avatar, information that is used to identify and characterize the originating community member, and information that identifies the media content event. The member avatars generated from reviews provided by a plurality of community members (community member "A", "B", through "i") are shown as being stored in the member avatar storage device 120 in FIG. 2. To conceptually illustrate the storage and organization of member avatars, the community member "A" has previously created a plurality of content reviews that were each used to generate a member avatar for particular media content events. Accordingly, for a first media content event (MCE1), the community member "A" has provided a review that is used to generate a first member avatar, denoted as MCE1 Member "A" avatar 234-1 (where this member avatar 234-1 is associated with the media content event 1 and the community member "A"). Similarly, for a second media content event (MCE2), the community member "A" has provided a different review that is used to generate a second member avatar, denoted as MCE2 Member "A" avatar 234-2 (where this member avatar 234-2 is associated with the media content event 2 and the community member "A"). Any particular community member may have provided numerous member's content review on different media content events. Accordingly, for an $n^{th}$ media content event (MCEn), the community member "A" has provided a review that is used to generate a first member avatar, denoted as MCE1 Member "A" avatar 234-$n$ (where this member avatar 234-$n$ is associated with the $n^{th}$ media content event and the community member "A").

Summarizing, each entry into the member avatar storage device 120 includes the data that is used to generate the audio and video of a lifelike animated member avatar, information identifying and characterizing the originating community member, and information identifying the particular media content event that the member avatar's review pertains to.

In FIG. 2, to conceptually disclose an example embodiment, the member avatars are arranged and grouped according to the originating community members. Alternatively, member avatars might be grouped in accordance with particular media content events, wherein all member avatars are grouped together for the associated media content event. In other implementations, no particular order of storage of generated member avatars is employed. Such embodiments simply search for member avatars based on the specified media content event that the user 114 is interested in. For example, an index or the like may be used to identify member avatars and their associated media content event, and to indicate where (that is, the storage location in any accessible storage medium or device) the information for each individual member avatar is stored in the member review storage device(s) 120.

Generating a lifelike animated member avatar may be performed in a variety of manners using various information by the member avatar generator 118. In some instances, the generated community member content review may have been created by a community member review recorder 116 that was configured to capture the entirety of the community member (from at least the top of their head to at least the bottom of their feet). For example, the community member may have been standing in front of a video camera that was far enough away to have a field of view that captured the entirety of the community member.

Here, the lifelike animated member avatar is generated by first selecting the audio portion of the generated community member content review that pertains to the media content event. The avatar generation logic 222 includes suitable natural language understanding (NLU) logic that identifies spoken words for an audio recording. NLU is part of a natural language processing system used in artificial intelligence systems employed by embodiments of the 360° content review system 100. In practice, the spoken words in the audio information are analyzed to generate machine representation language, such as sentences of text that correspond to the speaker's spoken words. Any suitable NLU logic now known or later developed may be used in the various embodiments.

In some situations, the entirety of the community member content review is directly related to their review (audible commentary) about the identified media content event. Here, the avatar generation logic 222 analyzes the generated machine representation language and would then determine that all of the sentences spoken by the community member are relevant to their review of the media content event, and therefore, should be included in the audio portion of the lifelike animated member avatar information. In this case, the entire audio portion of the received community member content review is selected for inclusion in the generated member avatar.

In practice, selected text (words and/or phrases) from the community member's spoken words are compared with stored keywords that are associated with media content events generally, and/or with keywords associated with the particular media content event that the community member's generated content review pertains to. For example, the community member's spoken words might include: the title of the media content event, a scene description, an actor's name, and/or a story line description. The community member's spoken words in proximity to the text (words and/or phrases) that corresponds to the keywords is then identified as pertaining to the content review for the media content event. Any suitable number of keywords about media content event in general, and/or about the particular media content event being reviewed, may be used for a comparison with selected text (words and/or phrases) determined from the community member's spoken words.

However, in many instances, portions of the received community member content review are not relevant to, or are not particularly relevant to, the media content event being reviewed by the community member. Here, the avatar generation logic 222 analyzes the generated machine representation language and identifies the sentences spoken by the community member that are not relevant to (or are not particularly relevant to) a review of the media content event. The audio portions corresponding to these non-relevant spoken sentences are not saved for inclusion in the generated lifelike animated member avatar. For example, the selected text (words and/or phrases) may simply describe other community members that they may know, the current date, information about where and/or when they viewed the media content event, or the like. This information may be relevant for other purposes, but such text (words and/or phrases) that do not match with the compared keywords indicates that the community member's spoken words in proximity to this text is not part of the content review. Therefore, these sentences spoken by the community member that are not relevant to (or are not particularly relevant to) the review of the media content event are not used in the generated member avatar.

To further illustrate operation of embodiments of the member avatar generator 118, the community member may have started their recorded content review by stating their name and/or the name (title) of the media content event. Here, this portion of the audio content may not be used for the generated member avatar since such audio content is likely not of particular interest to the viewing user 114. (However, avatar generation logic 222 that generates the machine representation language from this audio portion could use the audio information to identify the community member and/or identify the media content event being discussed in the received community member content review).

Once the relevant audio portions of the received community member content review that pertain to the content review have been identified, then the corresponding portions of the video information are accessed from the received community member content review. As one skilled in the art appreciates, synchronization of audio and image information in a video is well known in the arts. Any suitable synchronization process or system now known or later developed may be used such that the video portions of the community member's generated content review that are associated with the selected audio portions are identifiable for selection for incorporation into a member avatar.

The avatar generation logic 222 further includes image object identification logic that is configured to identify physical objects in the image information of the selected video image information received from the community member's recorder 116. Any suitable image object identification process or system now known or later developed may be used. Here, one skilled in the arts appreciates that a video comprises a series of still image frames that are sequentially arranged in an order of their capture, and which are presentable for a predefined duration to thereby create a video. The portion of received video images that are of the community member are identified and parsed out from the remainder of the video data by the image object identification algorithm, thereby creating a video of the community member that does not include any background and/or background objects. That is, only a video of the speaking community member remains after the background information has been removed from the video image information.

The generated video portions of the community member (with no background) are combined with the corresponding identified audio portions in a synchronous manner such that a video image of the community member speaking the selected audio portions is generated. This video image of the community member speaking the selected audio portions is then used to generate the member avatar. In situations where the video information included the entirety of the community member (for the top of their head to the bottom of their feet), then generation of the member avatar has been completed.

In some situations, the entirety of the community member's body may not be included in the video information portions of the received community member content review. In such situations, the avatar generation logic 222 may use one of a plurality of different strategies to generate a lifelike animated member avatar.

One example approach is to identify the community member's face in the received video information. The video of the community member's face is parsed out (wherein the remaining portions of the video information are deemed to be the background that is not used) and saved. That is, all but the community member's face is saved for generation of the member avatar.

The avatar and environment templates 228 stores a plurality of different generic member avatar templates. Each of the different member avatar templates may have a different appearing body portion and/or may have a different animated motions or bodily movements. One of the member avatar templates is selected from the avatar and environment templates 228, and then the community member's face is "stitched" onto or superimposed over the selected face region or portion of the selected member avatar template. That is, the face of the community member is added onto, or is otherwise incorporated into, the head portion of the selected member avatar template. Then, the audio portions are added such that a complete lifelike animated member avatar showing the community member's face is generated.

One skilled in the art appreciates that there are a limitless number of different member avatar templates that may be used. Simple member avatar templates may appear as outlines or stick figures of a person, an animal or an object with a solid colored fill background, such as a black fill. Here, the user 114 would view a presented member avatar as being a solid colored animated member avatar with the community member's speaking face superimposed over the head portion of the member avatar.

Other member avatar templates may be more complex, such as having clothing or the like of a particular style and/or color. In some situations, a particular member avatar template may be generated by filming an actor or other person in their entirety. The actor may be dressed in any desirable manner. Further, the actor may be directed to move in a variety of motions to simulate a situation of a community member talking about a media content event. The images of the actor or other person can be parsed out from the filmed background, and then saved as a member avatar template.

In other situations, such as when a famous actor or other person of interest is used as a basis of a member avatar template, the member avatar generator 118 can access a video clip of the famous actor or other person from a previously recorded video. Once the background is removed, then the video portion of the famous actor or other person can be used to generate the member avatar template. When a member avatar template based on a famous actor or other person is used to create a member avatar, the identified audio portions of the community member content review may be combined with the member avatar template to create a member avatar that resembles the famous actor or other person speaking the community member's review. Any suitable graphical animation process now used or later developed may be used to improve the lifelike appearance of the generated member avatar. For example, the lip movements of the speaking famous actor or other person may be modified to more closely resemble the lip movement of the spoken words of the community member. Additionally, audio characteristics of the selected audio portion of the content review may be modified so as to mimic the voice characteristics of the famous actor or other person such that the user 114 perceives that the famous actor or other person is speaking the content review.

Other member avatar templates can be comprised of wholly or partially animated characters. Any suitable animated character can be used as a member avatar template, such as cartoon characters, animals, plants, or even inanimate objects (such as a rock, a car, an airplane, a boat, etc.). In some instances, the animation of a member avatar template is specially made for purposes of creating member avatars. In other situations, the member avatar generator 118 may access a remote site, using the browser 230, to access images of a famous and well known animated character. Then, a desired member avatar template can be generated based on the accessed images of the animated character. Any suitable graphical animation process or system now known or later developed may be used by the various embodiments.

When a member avatar template based on an animated character is used to create a member avatar, the identified audio portions of the community member content review may be combined with the member avatar template to create a member avatar that resembles the animated character speaking the community member's review. Any suitable graphical animation process now used or later developed may be used to improve the lifelike appearance of the generated member avatar. For example, the lip movements of the animated character may be modified to more closely resemble the lip movement of the spoken words of the community member. Additionally, audio characteristics of the selected audio portion of the content review may be modified so as to mimic the voice characteristics of the animated character so that the user 114 perceives that the animated character is speaking the content review.

Alternatively, the face portion of the speaking community member may be superimposed on the head portion of the animated character (or on another designated portion of the animated character, such as when the animated character is a rock, tree or other object). Here, the user 114 will see the face of the community member superimposed on an animated character when they listen to (consume) that particular community member's content review.

In some situations, the video portion of the received community member content review includes a limited portion of the body (less than the entirety) of the speaking community member. For example, the video image may include the community member from their waist up or from their chest up. Here, the field of view of the image capture device in the community member content review recorder 116 may have been oriented in a manner such that only the waist up portion and face of the community member was captured. Alternatively, or additionally, the community member may have been sitting down in a chair and/or behind a table, or may have been behind another object. In such situations, the available portion of the community member's body is identified in the video information, and is then parsed out from the remaining background of the video. Then, a member avatar template or portion thereof that corresponds to the waist down or chest down portion of a generic person or animated character is accessed, and is then combined with the waist up or chest up video of the community member to create a lifelike animated member avatar.

In some instances, video and/or still images of an actual community member may have been previously stored in the member storage information device 124. For example, a video of the community member may have been created while the community member was talking about a different particular subject, a different particular topic, or even a different media content event. Or, a still image of their face, such as from a profile photograph, a casual photograph, or the like, may be available. Such videos and/or still images may be accessed and then processed for use in the generation of a member avatar.

In some instances, the video or still images of the community member may be analyzed to determine physical attributes and/or characteristics of the community member. For example, the community member's height, girth, or other physical dimensions may be determined and/or estimated based on attributes of the video or still images of the community member. In other situations, hair (or even facial hair) color, length, and/or style may be determined. Then, when an avatar template is selected (or portions thereof) for incorporation into a synthesized member avatar, the attributes and/or characteristics of the member avatar can be compared with the identified attributes and characteristics of the community member so that an avatar template more closely resembling the actual community member can be selected. For example, if the community member is relatively short in height, an avatar template corresponding to a shorter person can be selected (rather than an avatar template that corresponds to a very tall person). As another example, if the community member has long braided hair of a particular color, an avatar template having long braider hair of the same color may be selected. (Alternatively, the braided hair may be re-colored to more closely match the actual hair color of the community member.)

In the various embodiments, a generated information that defines a standardized member avatar is defined based on a standardized dimensional information (that is preferably defined using a per unit based system). In such a standardized system, each standardized member avatar is defined during generation with respect to a reference value. That is, the height and/or another standardized dimension information that represents a standardized member avatar is defined as an expression of system quantities, such as fractions of a defined base unit quantity or value.

For example, each standardized member avatar may be defined to have a base height (that is, based on a one per unit height). Here, a member avatar for a shorter community member may have a defined base height of 0.8 per unit. In contrast, another member avatar that is based on a tall community member may have a defined base height of 1.2 per unit. Any characteristic(s) may be selected to define a standardized member avatar.

As described herein in greater detail, the standardized dimensional information of a standardized member avatar is adjusted to create a perceived member avatar for each user 114 when the user 114 is experiencing their unique 360° virtual world 112 (FIG. 1). For example, for a first user, the member avatar may be associated with a community member that is a very close friend of the first user (thus, having a relatively high affinity value). Accordingly, based on a close interpersonal relationship (high affinity) to the first user, the dimensions of the standardized member avatar will be adjusted so that a perceived member avatar is presented as being in relatively close proximity to the first user. Here, the standardized member avatar is accessed from the member avatar storage device 120, and the dimensions of the standardized member avatar are scaled in size so as to create a perceived member avatar that appears to the first user as being very close to their current virtual position. For example, the standardized member avatar is retrieved from the member avatar storage device 120, and the base height (and/or other dimensions) may be scaled by a suitable factor (such as 1.2, for example) thereby increasing the perceived closeness of that perceived member avatar to the first user viewing that member avatar in their 360° virtual world 112 (since the presentation size of that member avatar is increased).

In contrast, for a second different user, the same standardized member avatar may be associated with a community member that is only a casual acquaintance of the second user (thus, having a relatively low affinity value). Accordingly, this same member avatar will be initially presented as being relatively far away from the second user. Here, that same standardized member avatar is accessed from the member avatar storage device 120, and the dimensions are scaled down in size so as to create a perceived member avatar that appears to the second user as being relatively far away from their current virtual position. That is, the standardized member avatar is scaled to create a perceived member avatar that has a depth perception to the viewing second user that is commensurate with the interpersonal relationship to that particular viewing second user (since the presentation size of that member avatar is decreased).

Summarizing the process of generating a member avatar, a community member's review is received from the recorder 116. The audio portion is analyzed to identify and select portions of the audio review that are relevant to the review of the identified media content event. When available, the corresponding video portions of the community member are accessed and are then processed to generate a portion of a generated member avatar. Next, remaining portions of a lifelike avatar template are accessed (in cases where less that the entirety of the community member is available from the received video information). The audio, available video portions of the community member, and any other needed avatar template information are combined to synthesize (generate) an animated lifelike standardized member avatar. The member avatar, when presented to a user, may then be perceived as an animated full-sized talking person or object discussing their review about a particular media content event. Generated standardized member avatars are stored in the member avatar storage device 120.

At some point in time, a user 114 may be interested in learning about a particular media content event of interest. Consuming one or more community member content reviews is a very effective way for the user 114 to learn about the media content event of interest. The user 114, wearing their HMD 106, enters into a 360° virtual world 112 that presents a plurality of selected member avatars in a 3D, 360° spherical virtual world (interchangeably referred to herein as the 360° virtual world 112). Each member avatar is an animated lifelike avatar that the user 114 can see and listen to while that member avatar presents the associated community member's generated content review.

As described in greater detail herein, two particular novel features in the presentation of the plurality of presented member avatars are facilitated by embodiments of the 360° content review system 100. First, since a very large number of previously generated and stored member avatars associated with the particular media content event of interest are likely available for any particular media content event, embodiments are configured to select a reduced number of the available member avatars that will be presented in the user's 360° virtual world 112. For example, a popular media content event may have hundreds, or even thousands of, generated and stored member avatars (each presenting a different community member's generated content review of that media content event). Presenting all of the available member avatars in such situations is not practical since there is a limited viewing space in the user's 360° virtual world 112. Accordingly, embodiments select a plurality of member avatars for presentation based on a determined interpersonal relationship between the user 114 and the community member who is associated with a particular member avatar. Here, each different user 114 will likely be presented different member avatars (since interpersonal relationships between each user and the community members who are associated with available member avatars will be different). Further, even if the same member avatar is presented for different users 114, their initial perceived presentation location within the 360° virtual world 112 will most likely be different (since interpersonal relationships between each user and the community members will be different). Even if, by coincidence, a particular member avatar is initially presented in the same perceived presentation location for multiple users 114, such a situation is acceptable in that the member avatar is only one of a plurality of different selected member avatars that are initially presented in the user's 360° virtual world 112.

Second, the interpersonal relationship between the user 114 and the community member who generated the content review are used to determine an initial perceived presentation location of the associated member avatar during initial presentation in the user's 360° virtual world 112. For example, the member avatar associated with the user's best friend may be initially presented in front of the user 114 as they enter into their 360° virtual world 112. In contrast, the member avatar associated with a casual acquaintance of the user 114 may have a defined initial perceived presentation location that is behind the user 114 (and is therefore, initially out of the field of view of the display 126 of the user's HMD 106). Here, the member avatar with the user's casual acquaintance only becomes visible to the user 114 only if the user's line of sight, or direction of view (orientation), is changed so that the user 114 is then looking behind them (from their initial line of sight).

Further, the effect of depth perception may also be used to determine the initial perceived presentation location of the selected member avatars. For example, the member avatar associated with the user's best friend may be initially presented so as to be perceived as being very close to the user 114 as they enter into their 360° virtual world 112. In contrast, the member avatar associated with a casual acquaintance of the user 114 may have a defined initial perceived presentation location that is perceived to be farther away from the user.

In practice, a user request generated by a device being used by the user 114 is communicated to the member avatar manager 122. For example, the user request may be communicated from the HMD 106, the media device 108, the recorder 112, or another electronic device (such as a smart phone or the like) over the communication network 110. The communication network interface 204 of the member avatar manager 122 receives the user request. The received user request includes information identifying the user and information identifying the media content event of interest. The communication network interface 204 may be similarly configured like the communication network interface 218 of the member avatar generator 118 described herein.

The processor system 202 of the member avatar manager 122, executing the avatar identification logic 208, identifies all of the available standardized member avatars associated with the media content event of interest identified in the user request that have been previously generated and stored in the member avatar storage device 120. Next, the processor system 202, executing the community member and community member (CM) avatar attributes comparison logic 210, compares the interpersonal relationship factors about the community member who generated the content review with information and interpersonal relationship factors for the requesting user 114. The interpersonal relationship factors may be retrieved from the member information storage device 124. Based on this comparison, an interpersonal relationship (an affinity value) between the requesting user 114 and each community member (associated with each of the identified member avatars associated with the media content event of interest) is determined.

Based on the determined interpersonal relationship with the requesting user 114, a plurality of available standardized member avatars are selected for initial presentation in the requesting user's 360° virtual world 112. In some embodiments, a predefined number of standardized member avatars are selected. The selected standardized member avatars are those having the highest affinity value to the user 114. The predefined number of selected standardized member avatars may vary based on the characteristics of the user's 360° virtual world 112. For example, if the user's 360° virtual world 112 is represented as a room in a building (such as a library, office, coffee shop or the like), a limited number of standardized member avatars may be selected. In contrast, if the user's 360° virtual world 112 is represented as a large area (such as an open landscape, a stadium, or the like), the a larger number of standardized member avatars may be selected. The predefined number of selected standardized member avatars for particular virtual world environments may be stored in the member information storage device 124 along with other the other community member information.

In practice, when a large number of standardized member avatars (interchangeably referred to herein as a member avatar for brevity) are available (and exceed the number of member avatars that may be practically initially presented in that user's 360° virtual world 112), many of the available member avatars are simply not selected for initial presentation. For example, the initially presented 360° virtual world 112 may be readily able to present one hundred (100) member avatars, each at a different initial perceived presentation location within the 360° virtual world 112. If a thousand member avatars are available to chose from, then nine hundred of the avatars will not be selected (and will not be initially presented in that user's 360° virtual world 112). To illustrate, many of the member avatars may have been generated by community members that the user simply does not know (and thus, have a very low affinity value). Absent other interpersonal relationship factors, these member avatars would not be selected for initial presentation in the user's 360° virtual world 112.

Then, the processor system 202 of the member avatar manager 122, executing the avatar location determination logic 208, identifies the initial perceived presentation location of each selected member avatar in the user's 360° virtual world 112. The initial perceived presentation location of a member avatar is characterized by several attributes. A presentation location is defined by attributes that are initial presentation location angles (a polar angle and an optional azimuth angle). A second presentation location attribute is an initial perceived distance.

The initial presentation polar angle is measured (defined) from a zero degree (0°) reference that corresponds to the user's initial direction of view (line of sight) when they enter their 360° virtual world 112. For example, the member avatar of the user's closest friend may be defined with a 0° initial presentation polar angle such that the user 114 initially sees that associated member avatar as being presented directly in front of them when they enter their 360° virtual world 112. In contrast, the member avatar of a casual acquaintance of the user 114 may be defined with a 180° initial presentation polar angle so as to have an initial presentation location that is behind the user 114 when they enter into their 360° virtual world 112.

The initial perceived distance corresponds to an initial distance that the member avatar is perceived from the user 114 when they enter into their 360° virtual world 112. This perceived distance is preferably defined in terms of a per unit distance. The base distance may be predefined to be any suitable perceived distance, such as three feet. For example, the member avatar of the user's closet friend may be defined with a 1.0 per unit initial perceived distance such that the user 114 initially sees (perceives) that associated member avatar as being presented three feet in front of them when they enter their 360° virtual world 112. Here, the dimension data for the standardized member avatar is accessed and the size (dimensions) of the standardized member avatar is scaled accordingly (using a 1.0 factor, or is simply not scaled in size in this example) so as to be perceived by the user 114 as being three feet away when the user 114 initially enters into their 360° virtual world 112.

In contrast, the member avatar of a casual acquaintance may be defined with a 6.0 per unit perceived distance so as to have an initial presentation location that is fifteen feet (6.0 time the three feet base value of three feet) from the user when they enter into their 360° virtual world 112. Here, the dimension data for standardized member avatar is accessed, and then the dimension data is scaled by a distance factor that adjusts the size (dimensions) of the presented member avatar so as to be perceived by the viewing user 114 to be at a distance of fifteen feet when the user 114 initially enters into their 360° virtual world 112.

In an example embodiment, after the plurality of standardized member avatars and their initial perceived presentation locations have been defined (based on the interpersonal relationship with the requesting user 114), the processor system 202 of the member avatar manager 122, executing the 360° virtual world generation logic 214, generates the 3D virtual reality data for the user's 360° virtual world 112. This data for the 360° virtual world 112 is available for communication to the user's HMD 106, via the communication network interface 204 over the communication network 110, where the visual portion of the data for the current field of view is presented on the display 126. In response to a selection of a particular member avatar by the user 114, the audio portion of the member avatar data is presented by speakers (not shown) of the HMD 106 (and/or by another audio presentation device).

Figure 3:
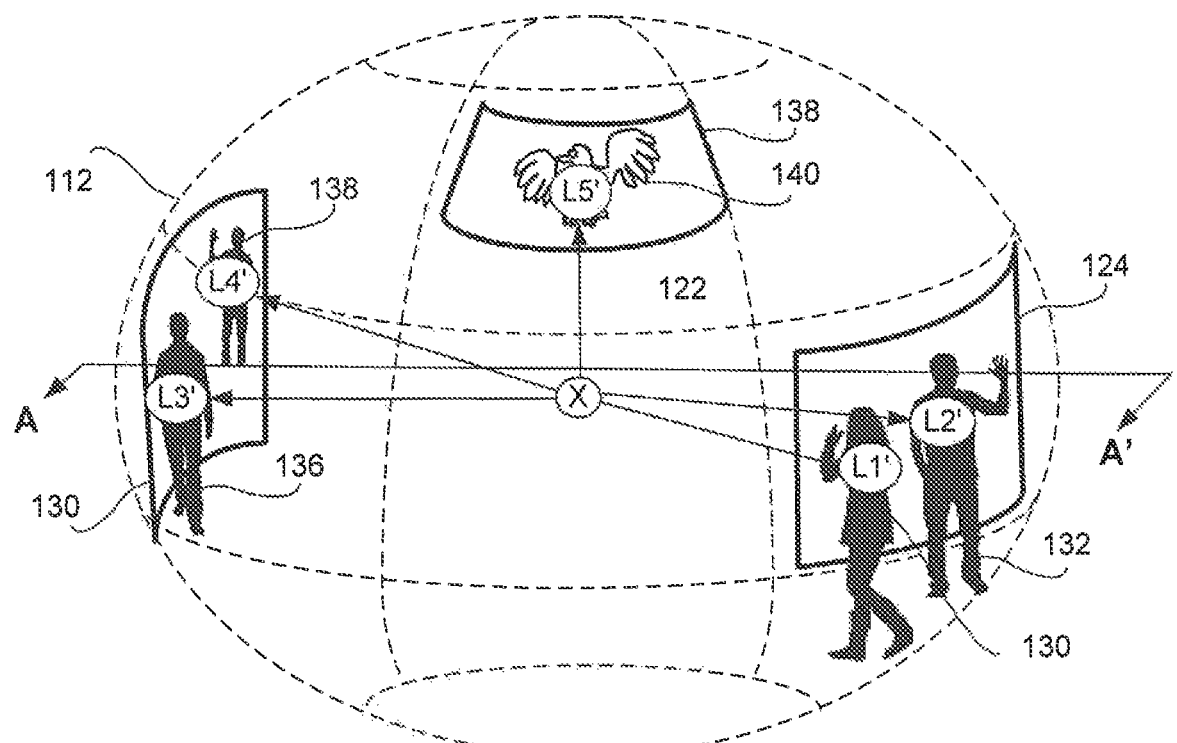
FIG. 3 is a conceptual depiction of a perspective view of the 360° virtual world generated by embodiments of the 360° content review system.
Figure 4:
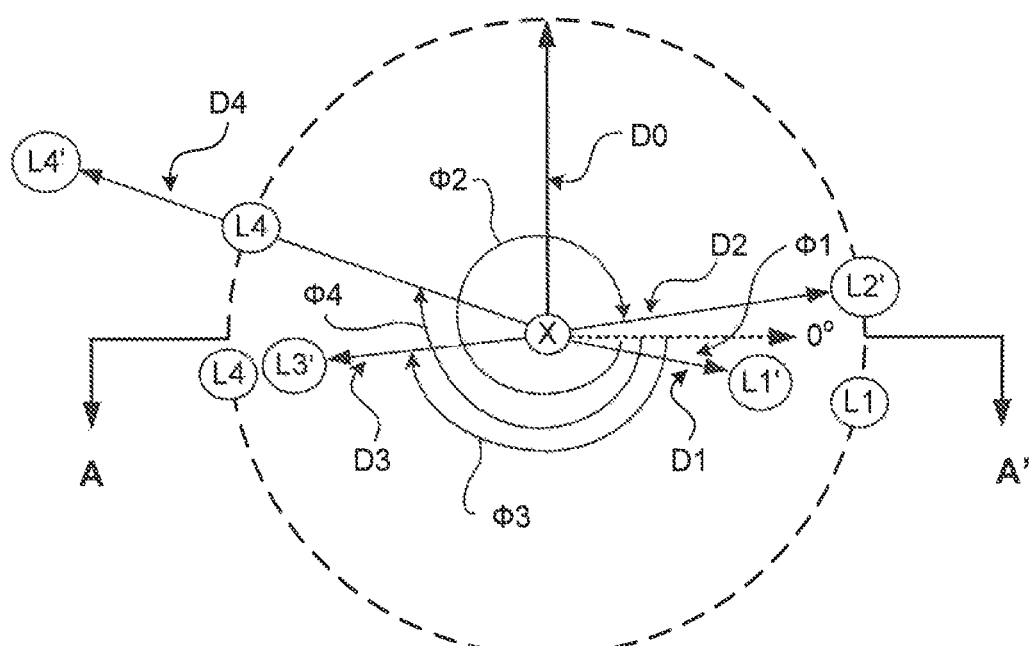
FIG. 4 is a conceptual depiction of a top view of the 360° virtual world (along the plane A-A' of the 360° virtual world shown in FIG. 4)

FIG. 3 is a conceptual depiction of a perspective view of the 360° virtual world 112 generated by embodiments of the 360° content review system 100. FIG. 4 is a conceptual depiction of a top view of the 360° virtual world 112 (along the plane A-A' of the 360° virtual world 112 shown in FIG. 4) generated by embodiments of the 360° content review system 100. Generation and subsequent presentation of three dimensional (3D) virtual reality worlds that provide a 360° spherical field of view to a user are well known to one skilled in the art. Accordingly, operation of such known virtual reality world generation and presentation systems are not explained in detail other than to the extent necessary to describe how such 3D virtual worlds may be improved in a novel manner by embodiments of the 360° content review system 100. Any suitable 3D virtual world generation and presentation system now known or later developed may be used by the various embodiments of the 360° content review system 100.

The exemplary 360° virtual world 112 of FIGS. 1 and 3-4 employ a spherical coordinate system to define perceived presentation locations of presented member avatars in the 360° virtual world 112. A spherical coordinate system can be perceived as the three-dimensional version of a polar coordinate system. Alternative embodiments may use any suitable coordinate system to define member avatar initial presentation locations, and/or manage presentation of member avatars in the user's 360° virtual world 112.

Figure 6:
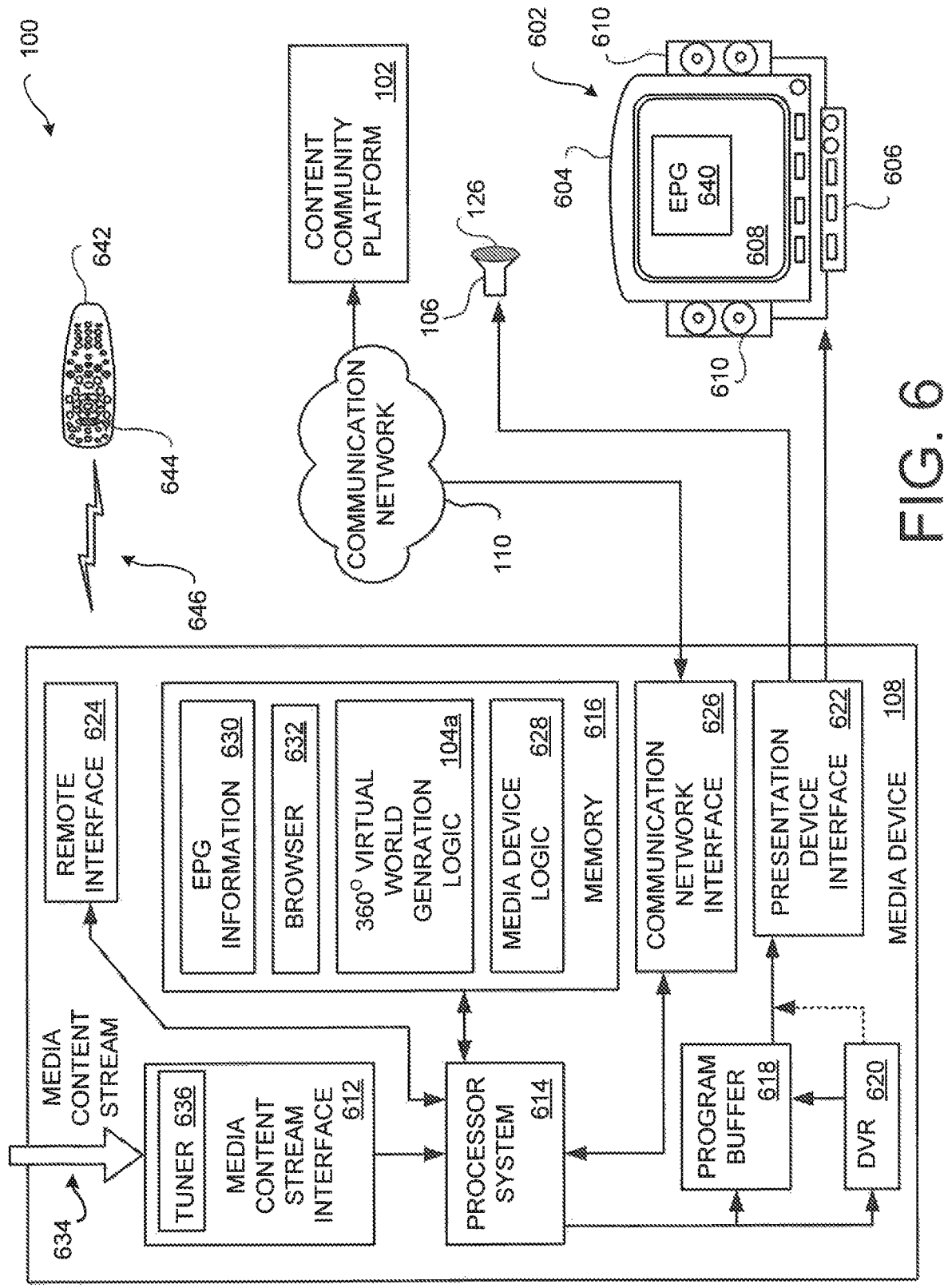
FIG. 6 is a block diagram of an exemplary media device.

The exemplary spherical coordinate system defines perceived presentation locations of member avatars in 3D space about an origin point (denoted as the origin point "X" in FIG. 6). Perceived presentation locations of presented member avatars are specified by three numbers: the radial distance of the location from a fixed origin point, a polar angle measured from a fixed zenith direction, and an azimuth angle of an orthogonal projection on a reference plane that passes through the origin point that is orthogonal to the zenith, measured from a fixed reference direction on that plane. Alternative embodiments may employ alternative coordinate systems to define the initial perceived presentation location of the selected member avatars that are to be presented in the user's 360° virtual world 112. Here, the fixed origin point X corresponds to the virtual location of the head of the user 114 with they enter into their 360° virtual world 112.

During the generation of a particular member avatar, the dimensions of the standardized member avatar are defined at some predefined radius distance from the origin point (denoted generally as the distance "D0" in FIG. 4). Accordingly, each standardized member avatar, prior to presentation in a particular user's 360° virtual world 112, has been generated and defined based on a projection distance that corresponds to a point on the surface of a 3D sphere centered about the user's head (wherein the location of the user's head is denoted as the origin point 'X'). One skilled in the art appreciates that scaling down the size (based on the initially defined dimensions of the standardized member avatar), or decreasing the presented size, of the image of a member avatar will create the perception to the viewing user that that member avatar is farther away from the user 114 in their 360° virtual world 112. Conversely, scaling up the size, or increasing the presented size, of the standardized member avatar will create the perception to the viewing user 114 that the member avatar is closer to the user 114 in their 360° virtual world 112.

To create the perception of depth in the 360° virtual world 112, a member avatar scaling factor is applied to the height and width dimensions of the initially generated standardized member avatar to create a perceived distance of that particular member avatar from the user 114. The member avatar scaling factor for any particular presented member avatar is determined from the perceived distance that is determined from the affinity value between the user 114 and the community member who is associated with that member avatar. For example, if the initial perceived distance is determined to be three times (3×) the base distance, then the dimensions of the standardized member avatar may be scaled down by a factor of three (or by another suitable scaling factor that corresponds to the determined initial perceived distance) so that the perceived member avatar appears farther away from the user 114 when that perceived member avatar is presented in the 360° virtual world 112.

To facilitate determination of a member avatar's presentation location, during generation of the standardized member avatar, a particular point or location on the member avatar body is defined as its presentation reference point. In an example embodiment, the centroid of the member avatar (generally corresponding to the geometric center of the member avatar) may be used to define the member avatar presentation reference point (though in alternative embodiments any suitable reference point on the member avatar may be defined to be its presentation reference point).

With respect to the hypothetical 360° virtual world 112 experienced by the user 114 as illustrated in FIG. 1, the process of generating a 360° virtual world 112 begins with the user 114 specifying a media content event of interest. The virtual world generation system 104 receives the user request, and then communicates the user request to the member avatar manager 122. The member avatar manager 122 identifies a plurality of member avatars that will be used in the generation of the 360° virtual world 112 that is to be experienced by the user 114. The member avatars are selected based on interpersonal relationships between the requesting user 114 and the community member associated with that member avatar.

In an example embodiment, the member avatar manager 122 determines the initial presentation location for each of the member avatars that are to be presented in the 360° virtual world 112. In the example 360° virtual world 112 of FIG. 1. For each member avatar, the initial polar angle and the initial azimuth angle (with respect to the member avatar's presentation reference point) are determined. The initial polar angle is measured from the initial line of sight of the user 114 as they initially enter into their 360° virtual world 112 based on the interpersonal relationship between the community member associated with that member avatar with the user 114. Here, member avatars having the defined polar angle closest to 0° have a higher affinity than member avatars which have their respective polar angles farther away from 0°. For example, a member avatar with a polar angle of 2° (or 358°) will have a higher affinity than a member avatar that is defined to have a polar angle of 180°.

The azimuth angle may be defined based on a variety of factors, such as a characteristic of the member avatar (such as a cartoon bird, a cartoon fish, or the like) and/or a characteristic of the user's selected virtual world environment (such as if hills and/or mountains are represented, or if a room with a level floor is represented). The azimuth angle defines a presentation height (elevation) of the member avatar that is above or below the user when the user initially enters into the presented virtual reality world. Accordingly, a characteristic of the member avatar may be used to define the azimuth angle. For example, a cartoon bird may have a high azimuth angle so as to be perceived as flying or as being higher above the viewing user 114. Alternatively, a cartoon avatar corresponding to a snake on the ground may have a negative value azimuth angle.

To conceptually illustrate the determined initial polar angle, FIG. 4 illustrates a vector oriented at a polar angle of zero degrees (0°) corresponding to the user's initial line of sight. Here, the initial presentation location of the member avatar 130 (FIGS. 1 and 3) is determined to be the polar angle $\theta 1$. That is, the initial presentation location of the member avatar 130 (before adjustment for depth perception) would be located on the sphere of the 360° virtual world 112 at a polar angle of $\theta 1$ (as measured from the user's initial line of sight) and at the predefined radius distance D0. This first location information is shown as location L1 in FIG. 4.

Similarly, the determined initial presentation location of the member avatar 132 (before adjustment for depth perception) would be located on the sphere of the 360° virtual world 112 at a polar angle of $\theta 2$ (as measured from the user's initial line of sight). This location information is shown as location L2 in FIG. 4. Likewise, the initial presentation location of the member avatar 136 (before adjustment or depth perception) would be located on the sphere of the 360° virtual world 112 at a polar angle of $\theta 3$ (as measured from the user's initial line of sight). This location information is shown as location L3 in FIG. 4. Finally, the initial presentation location of the member avatar 138 (before adjustment for depth perception) would be located on the sphere of the 360° virtual world 112 at a polar angle of θ4 (as measured from the user's initial line of sight). This location information is shown as location L4 in FIG. 4.

In this simplified hypothetical example, the assumed initial locations for each of the member avatars 130, 132, 136 and 138 each have an azimuth angle of 0° (since the heights of the member avatars are presented as being on a level with the user 114). That is, these member avatars, when presented in the user's 360° virtual world 112, will all be perceived by the user to be located on the same horizontal plane as the user 114. In contrast, the bird-like cartoon member avatar 140 is presented as being located above the viewing user 114. Accordingly, the initial presentation location for the animated member avatar 140 would include a non-zero value azimuth angle that would define how high above the user 114 the animated avatar 140 would be presented.

It is appreciated by one skilled in the art that a terrain-based virtual world environment would have portions of the 360° virtual world 112 with various surface heights. For example, the 360° virtual world 112 may simulate a geographic terrain with mountains, hills and/or valleys. Thus, the initial locations for various member avatars may also have a defined azimuth angle so as to simulate an elevation to the viewing user 114. In some embodiments, the defined elevation (or defined azimuth angle) may be determined based on the interpersonal relationship with the viewing user 114. For example, the community member with the greatest affiliation (highest interpersonal relationship) with the user 114 may be defined to have the highest azimuth angle, such as if they are presented as being located at the top of the mountain. Here, the viewing user 114 would intuitively understand that those member avatars that are higher up on the face of the mountain are more likely to have the most relevant and/or interesting content reviews.

Further, the initial presentation location of each member avatar includes a distance that corresponds to an initial perceived location (distance) of that member avatar from the viewing user 114. The perceived distance from the user 114 is also determined based on the interpersonal relationship of the community member and the user 114. Member avatars having a higher affinity to the user 114 (a higher degree of interpersonal relationship relative to the degree of interpersonal relationship of other member avatars) are initially presented at a closer perceived distance from the user 114. For example, community members who are close friends of the user 114 may be initially presented as being closer to the user 114 than casual acquaintances of the user 114.

Accordingly, the member avatar manager 122 determines a perceived distance for each member avatar based on the degree of interpersonal relationship between the associated community member and the user 114. For example, assuming that the community member associated with the member avatar 130 has the highest affinity with the user 114, the initial perceived distance of the member avatar 130 is determined to correspond to the distance D1 shown in FIG. 4. Here, the size (the height and width dimensions) of the standardized member avatar 130 is increased so that the initially presented member avatar 130 appears relatively close to the user 114 when the user 114 initially enters into their 360° virtual world 112. In an example embodiment, the ratio between the perceived distance D1 and the reference distance D0 defines a scaling factor that is used to adjust the size of the standardized member avatar. Other scaling factors may be used as appropriate to create a suitable depth perception for the user 114.

Similarly, the initial presentation location of the member avatar 132 is determined to have an initial presentation distance of D2. Here, the distance D2 is the same as the reference distance D0, so no scaling of the dimensions of the standardized member avatar 132 is required for initial presentation of that member avatar to the user 114.

The initial presentation location of the member avatar 136 is determined to have an initial presentation distance of D3. Here, the distance D3 indicates that there will be a scaling (increase) of the standardized member avatar 136 for the initial presentation to the user 114. Similarly, the initial presentation location of the member avatar 138 is determined to have an initial presentation distance of D4. Here, the distance D4 indicates that there will be a scaling (decrease) of the standardized member avatar 138 for the initial presentation to the user 114.

Summarizing, an initial presentation location L1' for the member avatar 130 is determined based on the polar angle θ1, a 0° azimuth angle, and an initial presentation distance D1. An initial presentation location L2' for the member avatar 132 is determined based on the polar angle θ2, a 0° azimuth angle, and an initial presentation distance D2. An initial presentation location L3' for the member avatar 136 is determined based on the polar angle θ3, a 0° azimuth angle, and an initial presentation distance D3. Finally, an initial presentation location L4' for the member avatar 138 is determined based on the polar angle θ4, a 0° azimuth angle, and an initial presentation distance D4.

As described herein, the initially defined polar angle, azimuth angle, and presentation distance for the selected member avatars is based on a determined interpersonal relationship (a degree of affinity) between the associated community member and the user 114. Thus, it is most likely that even if a first user 114 has the same selected member avatars as a different user, that the initial presentation locations of these same member avatars will be different since the interpersonal relationships between any requesting user 114 and the associated community members will be different.

For example, with respect to the member avatars 136 and 138 illustrated in FIGS. 1, 3, and 4, one skilled in the art appreciates that the community member associated with the member avatar 136 has a higher degree of interpersonal relationship (affinity) to the user 114 than the community member associated with the member avatar 138 (because the perceived initial presentation location of the member avatar 136 is closer to the user 114 than the perceived initial presentation location of the member avatar 138). Similarly, one skilled in the art appreciates that the community members associated with the member avatars 130 and 132 have a higher degree of interpersonal relationship (affinity) to the user 114 than the community members associated with the member avatars 136 and 138 (because the perceived initial presentation locations of the member avatars 130 and 132 are in the initial field of view of the user 114, while the perceived initial presentation locations of the member avatars 136 and 138 are not in the initial field of view of the user 114).

Summarizing the process of creating a 360° virtual world 112 for a particular user, embodiments first receive a user request that includes a specification for a particular media content event of interest. Based on the interpersonal relationships between community members who have provided a content review on the user specified media content event of interest, a plurality of associated standardized member avatars are identified that are likely to be of interest to the user 114 (since the associated community members have a relatively higher degree of affinity with the user 114 than those community members whose member avatars were not selected for inclusion into the 360° virtual world 112).

Next, based on the interpersonal relationship information between the user 114 and the community members associated with the selected standardized member avatars, an initial presentation location of each member avatar in the user's 360° virtual world 112 is determined. The initial presentation location for each member avatar is defined based on a determined polar angle, azimuth angle, and presentation distance.

In an exemplary embodiment, standardized member avatar information for each selected member avatars is then retrieved and communicated from the member avatar manager 122 to the virtual world generation system 104. Also, the initial location information is communicated from the member avatar manager 122 to the virtual world generation system 104. Then, the virtual world generation system 104 generates the initial 360° virtual world 112 based on the received information and the user-preferred 360° virtual world environment.

Figure 5:
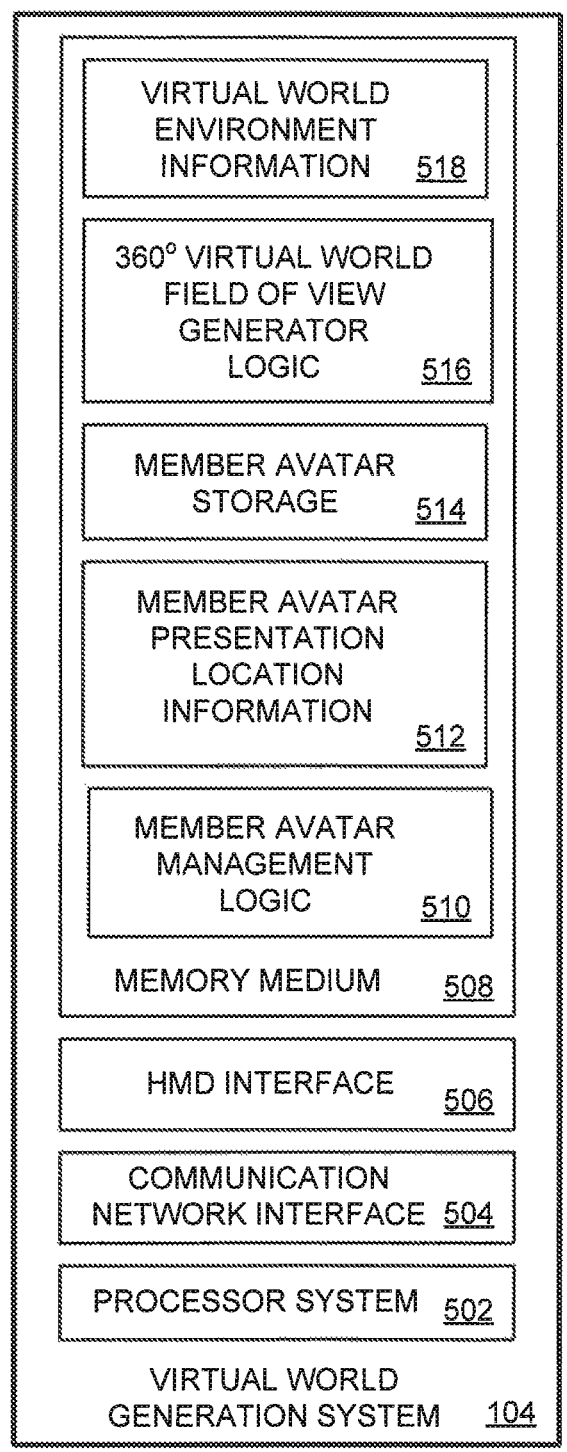
FIG. 5 is a block diagram of an example virtual world generation system.

FIG. 5 is a block diagram of an example virtual world generation system 104. The virtual world generation system 104 comprises a processor system 502, a communication network interface 504, a HMD interface 506, and a memory medium 508. The memory medium 508 comprises portions for storing the member avatar management logic 510, the member avatar presentation location information 512, the member avatar storage 514, the 360° virtual world field of view generation logic 516, and the virtual world environment information 518. In some embodiments, the member avatar management logic 510 and the 360° virtual world field of view generation logic 516 may be integrated together, and/or may be integrated with other logic. In other embodiments, some or all of these memory and other data manipulation functions may be provided by using a remote server or other electronic devices suitably connected via the Internet or otherwise to a client device. In some embodiments, when the virtual world generation system 104 is implemented in the media device 108, some components of the virtual world generation system 104 may also be components of the media device 108. Other virtual world generation systems 104 may include some, or may omit some, of the above-described media processing components. Further, additional components not described herein may be included in alternative embodiments The virtual world generation system 104 creates the initial 360° virtual world 112 seen by the user, and manages later presentation of the virtual world that is seen by the user 114 who is experiencing and who is interacting with their unique 360° virtual world 112. When the user initially enters into their 360° virtual world 112 (interchangeably referred to herein as the initial 360° virtual world 112), those member avatars having an initial presentation location within the initial field of view of the user 114 (as defined based on the initial line of sight of the user 114) are then presented on the display 126 of the HMD 106. Then, as the user changes their physical location and/or changes their viewing orientation, other member avatars are presented to the viewing user 114 based on the current field of view.

The member avatar management logic 510, when executed by the processor system 502, manages the communications between the virtual world generation system 104 and the components of the content community platform 102. Accordingly, the communication network interface 504 communicatively couples the virtual world generation system 104 to the communication network 110 (and may be similar to, or even identical to the interfaces 204, 218 of FIG. 2). The user specification of the media content of interest is received by the virtual world generation system 104, and a request for member avatar information is then communicated from the virtual world generation system 104 to the member avatar manager 122. Based on the user specified media content event of interest and the identity of the user 114, selected standardized member avatar information and the determined initial perceived presentation location information for each member avatar is returned to the virtual world generation system 104 by the member avatar manager 122.

The received standardized member avatar information (data) is stored in the member avatar storage 514 portion of the memory medium 508. The determined initial perceived presentation location information (data) is stored in the member avatar presentation location information 512 portion of the memory medium 508. The 360° virtual world environment information is stored into the virtual world environment information 514 portion of the memory medium 508. In some embodiments, the portions of the memory medium that store the member avatar presentation location information 512, the member avatar storage 514, and/or the virtual world environment information 518 may be integrated together into a single portion of the memory medium 508, or may be distributed locally or remotely in separate memory mediums.

In an example embodiment, the virtual world environment information 518 stores one or more virtual world environments that the user has previously specified. When the initial 360° virtual world 112 the selected member avatars and one of the user preferred virtual world environments are combined to synthesize (generate) the initial 360° virtual world 112 such that the user 114 views the member avatars superimposed over the selected virtual world environment. In an alternative embodiment, the user selected virtual world environment(s) may be stored in the member information storage device 124 along with other information pertaining to the user 114. The virtual world environment information can then be communicated to the virtual world generation system 104 along with the selected member avatars and their initially defined perceived presentation location information.

The HMD interface 506 communicatively couples the virtual world generation system 104 with the MHD 106. In an example embodiment, the HMD interface 506 is a suitable transceiver device that is configured to transmit information to and receive information from the HMD 106. Information may be communicated to and may be received from the HMD 106 using a wireless medium that employs IR or RF signals. Alternatively, or additionally, the HMD interface may employ a wire-based connector to communicatively couple to the HMD 106.

When the user 114 initially enters into their 360° virtual world 112, the HMD 106 provides initial orientation information that defines the current initial orientation of the HMD 106 in space. Location information defining the initial location of the HMD 106 may also be optionally provided. Based on the initial orientation and/or location information received from the HMD 106, the 360° virtual world field of view generation logic 516 determines the initial field of view that will be seen by the user 114 on the display 126. Then, the 360° virtual world field of view generation logic 516 identifies the member avatars that are to be presented in the initial field of view. Next, the 360° virtual world field of view generation logic 516 accesses the standardized member avatar information for the identified member avatars that are to be presented and accesses the associated initial perceived presentation location information.

Based on the accessed standardized member avatar and initial perceived presentation location information for the member avatars that are to be presented in the initial field of view, the 360° virtual world field of view generation logic 516 generates the perceived member avatars (based on the initial polar angle, the initial azimuth angle, and initial perceived distance for each presented standardized member avatar). Further, the 360° virtual world environment information is retrieved and that portion of the environment information corresponding to the initial field of view is determined. Then, the generated perceived member avatars and the corresponding environment information for the initial field of view are combined to create the initial field of view that will be seen by the user 114 when they initially inter into their 360° virtual world 112. The generated initial field of view information is then communicated to the HMD 106 for presentation of the display 126.

As the user 114 changes the position and/or orientation of their head, looks elsewhere with their eyes, and/or changes their physical position in the operating environment that they are in, the HMD 106 communicates the changing orientation and/or location information that is used to define a current field of view that the user 114 may be currently looking at. The virtual world generation system 104 then generates a current field of view that will be presented to the user 114 on a real time basis, or near real time basis, based on the current orientation and/or location information received from the HMD 106. For the current field of view, the perceived member avatars that are to be presented in the current field of view are generated and then combined with the associated virtual world environment information to generate the current field of view. The current field of view information is then communicated to the HMD 106 for presentation on the display 126.

Further, if the user 114 changes their physical location within the physical operating environment, then the change in the user's location is detected and is communicated to the virtual world generation system 104. Then, the virtual world generation system 104 determines new perceived presentation location information for each of the member avatars. For example, if the user 114 moves directly forward five feet (referenced to the initial 0° polar angle and as measured from the initial location "X"), then the initial presentation distance is decreased for those member avatars that are presented as being in front of the user, and the initial presentation distance for those member avatars behind the user 114 are increased. The associated polar angles and/or azimuth angles may also be adjusted, thereby creating a 360° virtual world 112 is which the user 114 may move about in a virtual manner. Any suitable 360° virtual world management system and/or process now known or later developed may be used by the various embodiments to facilitate the user's virtual experience while in their unique 360° virtual world 112.

When the user 114 initially enters into their 360° virtual world 112, they will see the plurality of member avatars within the virtual world environment. In an example embodiment, none of the member avatars will be speaking their content review. The user 114 must select a particular member avatar of interest, and in response to the user's selection, the selected member avatar begins to "speak" their content review. Alternatively, one (or a selected few) of the member avatars may initially be presenting their content review. In some embodiments, the viewable member avatars not yet selected by the user 114 may be animated (even though the user 114 does not hear any sounds apparently emitted by those animated unselected member avatars).

User selection of a member avatar of interest (for which the associated content review is to be presented) may be facilitated in a number of ways. In an example embodiment, the user may virtually "touch" a member avatar of interest to initiate presentation of the content review of the selected member avatar. Here, a sensor associated with the HMD 106 detects a movement of a hand of the user 114. A current location of the hand of the user is then determined based on (and in response to) the detected movement of the user's hand. The determined current location of the hand of the user 114 is compared with perceived presentation locations associated with each of the plurality of member avatars that are within the field of view (or alternatively, for all of the member avatars). The member avatar having the perceived presentation location that matches the determined current location of the hand of the user is selected. Here, when the current location of the user's hand corresponds to the current perceived location of a currently viewed member avatar, embodiments determine that the user has "virtually touched" that particular member avatar. For example, the user 114 may visually perceive that they are tapping the back or shoulder of a member avatar of interest. In response to the selection by a virtual touch of the member avatar by the hand of the user 114, the selected member avatar initiates presentation of their content review.

Other movements of the user 114 with concurrent detection of sounds made by the user 114 may be used to select a member avatar of interest. Here, concurrent detection of movement of the user's hands and a detection of sound improves the reliability of the determination that the user 114 intends to select a particular member avatar. For example, but not limited to, the user 114 may virtually clap their hands over a particular member avatar to initiate the selection of that member avatar. Here, a movement of a hand of the user and a clapping sound created by a clapping of the hands of the user are concurrently detected. A current location of the clapping hands of the user is determined in response to the detected movement of the hand of the user and the detected clapping sound. The determined current location of the hand of the user 114 is compared with perceived presentation locations associated with each of the plurality of member avatars that are within the field of view (or alternatively, for all of the member avatars). The member avatar having the perceived presentation location that matches the determined current location of the hand of the user is selected. Here, when the current location of the user's hand corresponds to the current perceived location of a currently viewed member avatar, that member avatar is selected so that presentation of the content review begins.

Any suitable user detection system and/or process now known or later developed for detection of user movements in a virtual world may be used by the various embodiments to detect an action or movement of the user for selection of a member avatar.

Alternatively, or additionally, the user 114 may specifically look at a particular member avatar of interest which is then automatically selected. Eye orientation sensors in the HMD may detect the orientation of the user's eyes and then determine which particular member avatar that the user 114 is looking at in their 360° virtual world 112. Here, a current direction of view of the user 114 is determined based on the determined current orientation of the eye of the user 114.

The determined current direction of view of the user 114 is compared with perceived presentation locations associated with each of the plurality of member avatars that are within the field of view (or alternatively, for all of the member avatars). The member avatar having the perceived presentation location that aligns with the determined current direction of view of the user is then selected. In response to the selection, the selected member avatar initiates presentation of their content review. In some embodiments, the selection occurs in response to the user 114 maintaining their current view on a particular member avatar for some predefined period of time, such as one or more seconds. If the user 114 looks at a member avatar for some predefined duration, then the intent of the user 114 to select that particular member avatar is more reliably determined.

Selection of a member avatar may be made when the user 114 points towards a member avatar of interest. Here, a movement of a hand of the user is detected. A current location of the hand of the user is determined based on (and in response to) to the detected movement of the hand of the user. Then, a current direction of orientation of the hand of the user is determined based on the determined current location of the hand of the user. The determined current direction of orientation of the hand of the user is compared with perceived presentation locations associated with each of the plurality of member avatars that are within the field of view (or alternatively, for all of the member avatars). The member avatar having the perceived presentation location that aligns with the determined current direction of orientation of the hand of the user is then selected to initiate presentation of the content review by that member avatar. In practice, an example embodiment compares a determined angle corresponding to the current direction of the user's hand or arm, and selected the member avatar having its polar angle that matches the determined angle of the user's hand or arm. In some embodiments, the selection occurs in response to the user 114 maintaining their pointing to a particular member avatar for some predefined period of time, such as one or more seconds. If the user 114 points at a member avatar for some predefined duration, then the intent of the user 114 to select that particular member avatar is more reliably determined.

Alternatively, or additionally, the user 114 may speak the name of the community member that is associated with the member avatar of interest. A microphone in the HMD 106 would detect the audible speech currently being spoken by the user, and a text recognition algorithm may identify the user's spoken words. Then, a name that has been spoken by the user is determined based on the detected audible speech spoken by the user. The determined name that has been spoken by the user is compared with the community member names associated with each of the plurality of member avatars, wherein the associated community member name identifies the community member who generated the audible commentary of the member avatar. The member avatar having the community member name that matches the determined name that has been spoken by the user is then selected. That is, the spoken name of the community member may be compared with name information of the member avatar to select the member avatar of interest. The selected member avatar then initiates presentation of their content review.

In some embodiments, after the user 114 has selected the member avatar of interest, the graphical portions of the other non-selected member avatars may fade away and/or may appear to move farther away from the user 114. Additionally, or alternatively, the audio portions of any speaking non-selected member avatars may be decreased in volume or muted. Alternatively, or additionally, the volume of the speaking selected member avatar may be increased. Here, the viewing user 114 perceives that they are hearing the audible commentary of the selected member avatar over other presented sounds so that the user 114 is better able to consume the currently selected member avatar's content review (since they will be less visually and/or audibly distracted by the non-selected member avatars). That is, the presented audible volume of the speaking member avatar is greater than the volume of other presented sounds.

Some embodiments of the 360° content review system 100 may provide assistance to the user 114 in identifying the community members associated with presented avatars. For example, if the current field of view presents three member avatars, the textual name of the community member may be shown adjacent to or in the proximity of the corresponding member avatar. Alternatively, or additionally, a natural language processing algorithm may be used to synthesize the name(s) of the community member(s) so that the user 114 audibly hears the name(s). The community member's name may be announced as the user 114 looks at a particular member avatar.

The user 114 may deselect a presenting member avatar at any time such that the content review ends. For example, the user 114 may look away from a currently presenting member avatar to stop or halt presentation of the currently presenting content review. Alternatively, the user may stop their virtual touch of the presenting member avatar. Alternatively, or additionally, the user 114 may speak a voice command (such as by staying "stop" or the like). In response to the user's indication, presentation of the content review is halted.

In some applications, the graphical portion of all member avatars may be animated in some manner, such as by being presented as talking (either their content review and/or random conversation), but the user 114 does not hear any sound from these animated member avatars. When the user 114 looks at a specific member avatar, the user 114 then hears the content review of that particular member avatar. If the user looks away and/or towards another member avatar, the user 114 no longer hears that member avatar's content review.

In some applications, a "visual zoom" in effect may appear to bring the selected member avatar closer to the user (or conversely, give the user 114 the sensation that they are moving closer to the selected member avatar). When the presentation of the content review has been completed, or if the user indicates that the presentation is to end, a visual "zoom out" effect may be used to return the member avatar and/or the user 114 to their previous location.

Additionally, or alternatively, an audio zoom in effect may increase the volume output of the audio portion of the content review. Here, the user 114 will be able to better hear the content review, and be less distracted by other background noise and/or voices. When the presentation of the content review has been completed, or if the user indicates that the presentation is to end, an audio zoom out effect may be user to return the volume to a previous level and/or to mute the volume.

In some embodiments, the user 114 may change the current virtual world environment to a different virtual world environment. For example, the current virtual world environment may be the above-described burger joint. The user 114 may switch to a different virtual world environment, such as the body of water environment. The change may be made in response to a verbal command spoken by the user.

Alternatively, or additionally, the user 114 may initiate the change using an electronic device, such as a remote control or the like.

Some member avatars may be configured to interact with the user 114 (defined herein as a touchable member avatar). For example, if the user 114 likes or agrees with the member avatar's content review, the user may "high five" or interact with that member avatar to demonstrate a like or preference for that content review. For example, the user 114 may virtually hug the member avatar and/or may virtually shake the hand of the member avatar.

Conversely, the user 114 may take another action to express a dislike or dissatisfaction with the content review. The action expressing dissatisfaction or dislike may be mild, such as by turning away from the presenting member avatar. However, the action expressing dissatisfaction or dislike may be extreme, such as violent actions pushing, hitting, cutting, shooting or even killing of an avatar that are commonly encountered with various action type gaming programs.

In some embodiments, the expressed user like/preference or user dislike/dissatisfaction is communicated back to the content community platform as feedback information. The user feedback is then later provided to the community member associated with the member avatar.

That community member may disregard the feedback. Alternatively, the community member may modify their content review based on the received feedback.

Alternatively, or additionally, the user 114 may speak words to the member avatar while the content review is being audible presented to the user 114. The spoken words of the user 114 may be saved, and then may be communicated back to the community member so that they can better appreciate how the user 114 reacted to their content review.

Alternatively, or additionally, the feedback from the user 114 may be used to adjust the community member's standard of expertise within the community. For example, if many users 114 express a like/preference for the content review of the same member avatar, then the community member's status may be elevated within the community, and accordingly, that community member's avatar may be selected on a more frequent basis and/or be associated with a higher interpersonal relationship factor when review of that media content event is requested in the future by other users 114. Conversely, if many users 114 express a dislike/dissatisfaction for the content review, then the community member's status may be reduced within the community, and accordingly, that community member's avatar may be selected on a less frequent basis and/or be associated with a lower interpersonal relationship factor when review of that media content event is requested in the future by other users 114.

In some embodiments, the content community platform advises a community member when their member avatar is selected for presentation is the user's 360° virtual world 112. The identify of the user 114 may be optionally indicated to the community member. Here, the community member appreciates how frequently their content review is selected, and/or who consumed their content review. Further, the community member may optionally review or modify (or even discard or erase) their content review based on this information. If the content review is modified, then the member avatar is modified by the member avatar generator 118.

Additionally, some embodiments may capture and save the user's experience while they are experiencing their 360° virtual world 112. Thus, a community member may later view the experience of the user 114, as if they were "walking in the shoes" of the user 114.

Further, some embodiments may be configured to permit the community member to interact with the user 114 in the user's 360° virtual world 112. For example, if the user 114 expresses a dislike or dissatisfaction with the community member's content review, the community member may virtually "enter" into the 360° virtual world 112 and express a rebuttal position. The entry of the community member into the user's 360° virtual world 112 may occur on a real time basis in some situations. In other situations, the community member's response is saved, and the next time that the user 114 enters into their 360° virtual world 112, the community member's rebuttal commentary may be presented to the user 114.

In some embodiments, when the user 114 initially enters into their 360° virtual world 112, an introduction is presented to the user 114 that audibly and/or graphically describes various information of interest about their selected virtual world environment. Alternatively, or additionally, information of interest about the specified media content event of interest may be audibly and/or visually presented to the user 114. Alternatively, or additionally, information of interest about the selected member avatars may be presented to the user 114. For example, the user may gaze about the initially presented 360° virtual world 112 so as to see text of the names of the associated community members. Alternatively, or additionally, the names of community members may be synthesized (or recording of the names as spoken by the community member) and audibly presented as the user looks at or towards particular member avatars. Thus, the user 114 is better oriented before they begin to experience their unique 360° virtual world 112.

In some instances, the user 114 may halt the current presentation of their 360° virtual world 112 before all content review have been consumed. In some embodiments, the current 360° virtual world 112, and information about the consumed content reviews and interactions by the user 114, are saved by the virtual world generation system 104. In the event that the user 114 later renters into that particular 360° virtual world 112 to access additional content reviews, or to later consume other content reviews, that initial presentation of the 360° virtual world 112 can resume at a point that the user 114 previously left their 360° virtual world 112. Here, each time the user 114 enters into their unique 360° virtual world 112, the user 114 will have a different experience. However, that new experience will be based on the previously defined experience.

The example embodiment described in FIG. 1 utilized a virtual world generation system 104 implemented in a media device 108, such as a set top box or the like. Alternatively, the virtual world generation system 104 may be implemented remotely. For example, but not limited to, the virtual world generation system 104 may be implemented in a remote server and/or at the content community platform 102. Accordingly, such a virtual world generation system 104 may include a suitable communication interface (such as the interfaces 204, 218) to communicatively couple to the member avatar manager 122 and the HMD 106.

Alternatively, the virtual world generation system 104 may be an integrated component or system of the user's HMD 106. Here, the HMD 106 may include a suitable communication interface (such as the interfaces 204, 218) to communicatively couple to the member avatar manager 122.

In the various embodiments, the communication network 110 communicatively coupled the review recorders 116, the member avatar generator 118, the member avatar manager 122, and the virtual world generation system 104 with each other. The communication network 110 is illustrated as a generic communication system. In one embodiment, the communication network 110 comprises a cellular telephone system, such as a radio frequency (RF) wireless system. Alternatively, the communication network 110 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, alternative embodiments may be implemented to communicate using other types of communication technologies, such as but not limited to, digital subscriber loop (DSL), X.26, Internet Protocol (IP), Ethernet, Integrated Services Digital Network (ISDN) and asynchronous transfer mode (ATM). Also, alternative embodiments may be configured to communicate over combination systems having a plurality of segments which employ different formats for each segment that employ different technologies on each segment.

FIG. 6 is a block diagram of an exemplary media device 108 such as, but not limited to, a set top box (STB). Embodiments of the 360° content review system 100 may be implemented in other media devices, such as, but not limited to, stereos, surround-sound receivers, radios, televisions (TVs), digital video disc (DVD) players, digital video recorders (DVRs), cellular phones equipped with video functionality, personal device assistants (PDAs), game playing devices, or personal computers (PCs) that are configured to present a video-based media content event that is received in a media content stream 634 and/or present the 360° virtual world 112 to the user 114.

The exemplary media device 108 is communicatively coupled to a media presentation system 602 that includes a visual display device 604, such as a television (hereafter, generically a TV), and an audio presentation device 606, such as a surround sound receiver controlling an audio reproduction device. The video portion of the media content event is presented to a user on a display 608 of the visual presentation device 604. The audio portion of the media content is reproduced as audible sounds by one or more speakers 610 of the audio presentation device 608. Other types of output devices may also be coupled to the media device 108, including those providing any sort of stimuli sensible by a human being, such as temperature, vibration and the like. In some embodiments, the media device 108 and one or more of the components of the media presentation system 602 may be integrated into a single electronic device.

The non-limiting exemplary media device 108 comprises a media content stream interface 612, a processor system 614, a memory 616, a program buffer 618, an optional digital video recorder (DVR) 620, a presentation device interface 622, a remote interface 624, and a communication interface 626. The memory 616 comprises portions for storing the media device logic 628, the electronic program guide (EPG) information 630 an optional browser 632, and the 360° virtual world generation logic 104a (if the implemented as logic). In some embodiments, the video device logic 218, the browser 632 and the 360° virtual world 112 (if implemented as logic) may be integrated together, and/or may be integrated with other logic. In other embodiments, some or all of these memory and other data manipulation functions may be provided by using a remote server or other electronic devices suitably connected via the Internet or otherwise to a client device. Other media devices 112 may include some, or may omit some, of the above-described media processing components. Further, additional components not described herein may be included in alternative embodiments.

The functionality of the media device 108, here a set top box, is now broadly described. In a satellite broadcast system, a media content provider provides media content that is received in one or more multiple media content streams 634 multiplexed together in one or more transport channels. The transport channels with the media content streams 634 are communicated to the media device 108 from a media system sourced from a remote head end facility (not shown) operated by the media content provider. The media device 108 is configured to receive one or more broadcasted satellite signals detected by an antenna (not shown). Non-limiting examples of other media systems that broadcast a media content stream 634 include a cable system, a radio frequency (RF) communication system, and the Internet.

The one or more media content streams 634 are received by the media content stream interface 612. One or more tuners 636 in the media content stream interface 612 selectively tune to one of the media content streams 634 in accordance with instructions received from the processor system 614. The processor system 614, executing the media device logic 628 and based upon a request for a media content event of interest specified by a user 114, parses out media content associated with the media content event of interest. The media content event of interest is then assembled into a stream of video and/or audio information which may be stored by the program buffer 618 such that the media content can be streamed out to components of the media presentation system 106, such as the visual display device 604, the audio presentation device 606, and/or the HMD 106, via the presentation device interface 622. Alternatively, or additionally, the parsed out media content may be saved into the DVR 620 for later presentation. The DVR 620 may be directly provided in, locally connected to, or remotely connected to, the media device 108. In alternative embodiments, the media content streams 634 may stored for later decompression, processing and/or decryption.

From time to time, information populating the EPG information 630 portion of the memory 616 is communicated to the media device 108, via the media content stream 634 or via another suitable media. The EPG information 630 portion of the memory 616 stores the information pertaining to the scheduled programming. The information may include, but is not limited to, a scheduled presentation start and/or end time, a program channel, and descriptive information. The program's descriptive information may include the title of the program, names of performers or actors, date of creation, and a summary describing the nature of the program. Any suitable information may be included in the program's supplemental information. Upon receipt of a command from the user requesting presentation of an EPG display, the information in the EPG information is retrieved, formatted, and then presented on the display 608 as an EPG 640. The user 114 may specify the media content event of interest via the EPG 640.

The exemplary media device 108 is configured to receive commands from a user via a remote control 642. The remote control 642 includes one or more controllers 644 disposed on the surface of the remote control 642. The user, by actuating one or more of the controllers 644, causes the remote control 642 to generate and transmit commands, via a wireless signal 646, to the media device 108. Preferably, each individual one of the controllers 644 has a specific predefined function that causes a specific operation by the media device 108 and/or by components of the media presentation system 602. The commands communicated from the remote control 642 then control the media device 108 and/or control components of the media presentation system 602. The wireless signal 646 may be an infrared (IR) signal or a radio frequency (RF) signal that is detectable by the remote interface 624.

In an example embodiment, one of the controllers 644 may be a dedicated controller that is used to generate the user request that specifies the media content event of interest that the user is interested in receiving reviews on. In practice, the user may navigate about a presented EPG 640 to highlight the media content event of interest and/or search for the media content event of interest. In response to the user's actuation of the dedicated controller 644, the user request is generated and communicated to the member avatar manager 122. In some implementation, icons may be employed for presentation on the EPG 640. An icon would indicate to the viewing user 114 that reviews are available for consumption in a 360° virtual world 112.

Additionally, or alternatively, the user 114 may actuate one of the controllers 644 such that a currently presenting media content event is designated as the user specified media content event of interest. For example, the user may be watching a movie on their television. The user, who is interested in receiving reviews of the movie, would optionally pause the movie, put on their HMD 106, and then seek community member reviews by experiencing their unique 360° virtual world 112. Alternatively, the user may be consuming the movie through their HMD 106. Here, presentation may simply transfer from the movie into the user's 360° virtual world 112.

Additionally, or alternatively, the controllers 644 may be operated to specify the media content event of interest. For example, the controllers 644 may be arranged as a suitable alpha-numeric key pad that permits the user to specify the title or other suitable identifier of the media content event of interest. Interactive graphical user interfaces (GUIs) now known or later developed may be user to facilitate the user's specification using the remote control 642.

The processes performed by the media device 108 relating to the processing of the received media content stream 634 and communication of a presentable media content event to the components of the media presentation system 106 are generally implemented by the processor system 614 while executing the media device logic 628. Thus, the media device 108 may perform a variety of functions related to the processing and presentation of one or more media content events received in the media content stream 634.

As used herein, an affinity is an attractive force between the user 114 and a particular community member. The affinity is a quantifiable value that is determined based on one or more interpersonal relationship factors between the user 114 and the community member. A higher value of affinity corresponds to a stronger magnitude of attraction. In the various embodiments, the member avatar manager 122 computes the affinity between the user 114 and all community members who have provided review of the user specified media content event of interest. Any suitable system or process now known or later developed for determining values of affinity may be used by the various embodiments.

It should be emphasized that the above-described embodiments of the 360° content review system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method of presenting member content reviews selected from a first plurality of member content reviews, wherein each one of the first plurality of member content reviews pertain to a particular media content event identified by each member content review, and wherein the presented member content reviews are presented to a user using a virtual world presentation system that presents a virtual reality world to the user, the method comprising:
   receiving a user request from the user, including:
      a user specification of a media content event that the user has an interest in; and
      a user identifier that uniquely identifies the user;
   identifying a second plurality of member content reviews from the first plurality of member content reviews, wherein each one of the second plurality of member content reviews comprises at least an audible commentary made by a community member describing the identified media content event, and wherein an identifier of the media content event of each of the second plurality of member content reviews is the same as the user specified media content event;
   selecting a third plurality of community member content reviews from the second plurality of community member content reviews based on a degree of affinity between the user and each community member associated with each of the identified second plurality of community member content reviews;
   creating a modified audible commentary for each of the third plurality of member content reviews by:
      analyzing spoken words in the audible commentary to generate a text corresponding to the spoken words;
      comparing the text with one or more key words to identify one or more non-relevant text portions that are not relevant to the media content event; and
      removing portions of the audible commentary corresponding to the non-relevant text portions;
   retrieving a plurality of member avatars, wherein each of the plurality of member avatars corresponds to one of the third plurality of member content reviews, wherein each one of the retrieved plurality of member avatars comprises:
      the modified audible commentary made by the associated community member that describes the user specified media content event; and
      graphical information that is configured to graphically render an animation of a member avatar, wherein the animation of the member avatar is synchronized with the modified audible commentary;
   communicating the plurality of member avatars to the virtual world presentation system; and
   graphically presenting the plurality of member avatars in the virtual reality world on a display of the virtual world presentation system,
   wherein each of the plurality of member avatars will audibly present the modified audible commentary made by the community member in response to a user selection of that member avatar.

2. The method of claim 1, further comprising determining an initial presentation location for each one of the retrieved plurality of member avatars, wherein the initial presentation location of each of the member avatars in the presented virtual reality world includes an initial perception distance determined based on the degree of affinity between the user and the respective community member, wherein the initial perception distance defines a depth that the viewing user perceives the initial presentation location of the member avatar in the presented virtual reality world; wherein each of the plurality of member avatars are initially presented in the virtual reality world at their respective initial presentation location; wherein the initial presentation location further comprises: a polar angle, wherein the polar angle is an angle that is measured from the user's initial direction of view when the user initially enters into the presented virtual reality world; and wherein the polar angle is determined based on the determined degree of affinity between the user and the respective community member.

3. The method of claim 2, wherein the initial presentation location further comprises:
an azimuth angle, wherein the azimuth angle defines a presentation height of the member avatar that is above or below the user when the user initially enters into the presented virtual reality world, wherein the azimuth angle is determined based on the determined degree of affinity between the user and the respective community member or a characteristic of the member avatar.

4. The method of claim 2, wherein the communicated plurality of member avatars are each defined by standardized member avatar information, wherein the standardized member avatar information includes standardized dimensional information that is used to render the corresponding member avatar, wherein the standardized dimensional information is based on a predefined radius distance from an origin point of the virtual reality world, and wherein rendering and graphically presenting each one of the plurality of member avatars comprises:
determining a scaling factor that corresponds to a ratio between the predefined radius distance and the initial perception distance; and
scaling the standardized dimensional information in accordance with the determined scaling factor to generate a perceived member avatar with a perceived size that corresponds to the scaled standardized dimensional information,
wherein the perceived member avatar is then rendered and is graphically presented in the user's virtual reality world, and
wherein the perceived member avatar will be perceived by the user as being located at a perceived distance from the user that corresponds to the initial perception distance.

5. The method of claim 1, wherein a number of the plurality of member avatars reviews does not exceed a predefined number of member avatars, wherein the predefined number of member avatars is based on a virtual world environment that has been selected by the user, and wherein the selected virtual world environment is a background that comprises images of a plurality of physical objects that are presented around the presented plurality of member avatars.

6. The method of claim 1, further comprising:
receiving a user specification of a virtual world environment, wherein the specified virtual world environment is a background that comprises images of a plurality of physical objects that are presented around the presented plurality of member avatars, and wherein the specified virtual world environment and the plurality of member avatars are rendered and presented together to create the virtual reality world that is presented to the user on the display of the virtual world presentation system.

7. The method of claim 6, wherein the user specification of the virtual world environment is a first user specification of a first virtual world environment, the method further comprising:
receiving a second user specification of a second virtual world environment after the virtual reality world is initially presented to the user, wherein the second virtual world environment is different from the first virtual world environment;
presenting the virtual reality world based on the second virtual world environment in response to receiving the second user specification of the second virtual world environment, wherein the currently presented virtual reality world includes the plurality of member avatars; and
revising at least one appearance characteristic of at least one of the member avatars based on a characteristic of the second virtual world environment.

8. The method of claim 1, further comprising:
receiving a user selection of one of the plurality of member avatars, where in response to the user selection, the selected member avatar begins presentation of the modified audible commentary made by the associated community member.

9. The method of claim 8, further comprising:
increasing a presentation size of the selected member avatar in response to
receiving the user selection of one of the plurality of member avatars,
wherein the viewing user perceives that they become closer to the selected member avatar.

10. The method of claim 8, further comprising:
increasing a volume of the modified audible commentary being made by the selected member avatar in response to receiving the user selection of one of the plurality of member avatars,
wherein the viewing user perceives that they are hearing the modified audible commentary of the selected member avatar over other presented sounds.

11. The method of claim 8, wherein receiving the user selection of one of the plurality of member avatars comprises:
detecting audible speech currently being spoken by the user;
determining a name that has been spoken by the user based on the detected audible speech spoken by the user;
comparing the determined name that has been spoken by the user with community member names associated with each of the plurality of member avatars, wherein the associated community member name identifies the community member who generated the modified audible commentary of the member avatar; and
selecting the member avatar having the community member name that matches the determined name that has been spoken by the user.

12. The method of claim 8, wherein receiving the user selection of one of the plurality of member avatars comprises:
detecting a movement of a hand of the user;
determining a current location of the hand of the user in response to the detected movement of the hand of the user;
comparing the determined current location of the hand of the user with perceived presentation locations associated with each of the plurality of member avatars; and selecting the member avatar having the perceived presentation location that matches the determined current location of the hand of the user.

13. The method of claim 8, wherein receiving the user selection of one of the plurality of member avatars comprises:
   detecting a movement of a hand of the user;
   determining a current location of the hand of the user in response to the detected movement of the hand of the user;
   determining a current direction of orientation of the hand of the user based on the determined current location of the hand of the user;
   comparing the determined current direction of orientation of the hand of the user with perceived presentation locations associated with each of the plurality of member avatars; and
   selecting the member avatar having the perceived presentation location that aligns with the determined current direction of orientation of the hand of the user.

14. The method of claim 8, wherein receiving the user selection of one of the plurality of member avatars comprises:
   detecting a movement of a hand of the user and concurrently detecting a clapping sound created by a clapping of the hands of the user;
   determining a current location of the clapping hands of the user in response to the detected movement of the hand of the user and the detected clapping sound;
   determining a current direction of orientation of the hand of the user based on the determined current location of the hand of the user;
   comparing the determined current location of the hand of the user with perceived presentation locations associated with each of the plurality of member avatars; and
   selecting the member avatar having the perceived presentation location that matches the determined current location of the hand of the user.

15. The method of claim 8, wherein the virtual world presentation system is a head mounted display ("HMD"), and wherein receiving the user selection of one of the plurality of member avatars comprises:
   detecting an orientation of an eye of the user with an eye orientation sensor of the HMD;
   determining a current direction of view of the user based on the determined current orientation of the eye of the user;
   comparing the determined current direction of view of the user with perceived presentation locations associated with each of the plurality of member avatars; and
   selecting the member avatar having the perceived presentation location that aligns with the determined current direction of view of the user.

16. The method of claim 1, wherein the plurality of member avatars is a first plurality of member avatars, wherein the virtual world presentation system is a head mounted display (HMD), and wherein rendering and graphically presenting the plurality of member avatars in the virtual reality world on the display of the HMD comprises:
   determining an initial field of view that corresponds to a portion of the virtual reality world that is initially presented on the display of the HMD; and
   identifying a second plurality of member avatars from the first plurality of member avatars,
   wherein the second plurality of member avatars each have their respective initial presentation location within the determined initial field of view,
   wherein the second plurality of member avatars are presented on the display of the HMD, and
   wherein remaining members of the first plurality of member avatars are not rendered and presented on the display of the HMD.

17. The method of claim 16, wherein after initially presenting the virtual reality world on the display of the HMD, the method further comprises:
   detecting a movement of the HMD when the user looks in a different direction;
   determining a current orientation direction of the HMD in response to detecting the movement;
   determining a new field of view that is presented on the display of the HMD; and
   identifying a third plurality of member avatars from the first plurality of member avatars,
   wherein the third plurality of member avatars each have their respective initial presentation location within the determined new field of view,
   wherein the third plurality of member avatars are presented on the display of the HMD, and
   wherein remaining members of the first plurality of member avatars are not rendered and presented on the display of the HMD.

18. A method of presenting member content reviews of a media content event using a virtual world, the method comprising:
   receiving a content review from a community member of a social media community, wherein the content review comprises:
      audio content that is being spoken by the community member; and
      information that uniquely identifies the media content event that is being commented on by the community member;
   identifying an audio content portion of the received audio content that verbally describes the community member's spoken commentary about the media content event, wherein identifying the audio content portion comprises:
      analyzing spoken words in the received audio content to generate a text corresponding to the spoken words;
      comparing the text with one or more key words to identify one or more non-relevant text portions that are not relevant to the review of the media content event; and
      removing portions of the received audio content corresponding to the non-relevant text portions;
   generating a member avatar, wherein the member avatar comprises:
      the identified audio content portion; and
      graphical information that is configured to graphically render an animated member avatar, wherein the animated member avatar is synchronized with the identified audio content portion;
   receiving a user request for a review of the media content event from a user; and
   presenting the member avatar on a display when the media content event identified in the user request is the same as the media content event associated with the member avatar.

19. The method of claim 18, further comprising:
   storing the member avatar with a first plurality of member avatars;
   identifying a second plurality of member avatars from the first plurality of member avatars, wherein an associated media content event of each of the second plurality of member avatars are the same as the media content event identified in the user request;

determining a degree of affinity between the user and each community member who is associated with the second plurality of member avatars; and selecting a third plurality of member avatars from the second plurality of member avatars, wherein the third plurality of member avatars have a higher degree of affinity than other ones of the second plurality of member avatars which were not selected, and wherein the third plurality of member avatars are all presentable on the display.

20. The method of claim 18, wherein the member avatar is presented at an initial perception distance based on a determined degree of affinity between the requesting user and the community member, wherein the initial perception distance defines a depth that the viewing user perceives a location of the member avatar in the presented virtual reality world.

* * * * *